(12) United States Patent
Ikuta et al.

(10) Patent No.: US 7,553,912 B2
(45) Date of Patent: Jun. 30, 2009

(54) COMPOSITE DISPERSION AND PROCESS FOR PRODUCING THE SAME

(75) Inventors: Toru Ikuta, Kobe (JP); Hajime Komada, Himeji (JP); Mitsuteru Mutsuda, Himeji (JP)

(73) Assignee: Daicel-Evonik Ltd., Tokyo (JP)

( * ) Notice: Subject to any disclaimer, the term of this patent is extended or adjusted under 35 U.S.C. 154(b) by 780 days.

(21) Appl. No.: 10/520,205

(22) PCT Filed: Jul. 4, 2003

(86) PCT No.: PCT/JP03/08571

§ 371 (c)(1),
(2), (4) Date: Jan. 4, 2005

(87) PCT Pub. No.: WO2004/007617

PCT Pub. Date: Jan. 22, 2004

(65) Prior Publication Data

US 2006/0149000 A1   Jul. 6, 2006

(30) Foreign Application Priority Data

Jul. 12, 2002   (JP) ............................. 2002-204297

(51) Int. Cl.
*C08C 19/20* (2006.01)
*C08L 77/00* (2006.01)

(52) U.S. Cl. ................. 525/343; 525/178; 523/400; 524/186; 524/394; 524/502; 524/599; 524/609; 524/612

(58) Field of Classification Search .............. None
See application file for complete search history.

(56) References Cited

U.S. PATENT DOCUMENTS 4,803,244 A   2/1989   Umpleby

FOREIGN PATENT DOCUMENTS

| CN | 1122345 A | 5/1996 |
|---|---|---|
| CN | 1336395 A | 2/2002 |
| EP | 0710701 A1 | 5/1996 |
| EP | 0 867 471 A1 | 9/1998 |
| EP | 1 006 150 A1 | 6/2000 |
| EP | 1 041 103 A2 | 10/2000 |
| GB | 2 128 899 A | 5/1984 |
| JP | 50-25682 | 3/1975 |
| JP | 60-186550 A | 9/1985 |
| JP | 2-150439 A | 6/1990 |
| JP | 2-242852 A | 9/1990 |
| JP | 3-38114 A | 2/1991 |
| JP | 3-133631 A | 6/1991 |
| JP | 4-88054 A | 3/1992 |
| JP | 06-107741 A | 4/1994 |
| JP | 06-256440 A | 9/1994 |
| JP | 06-298944 A | 10/1994 |
| JP | 7-11013 A | 1/1995 |
| JP | 8-156188 A | 6/1996 |
| JP | 9-124803 A | 5/1997 |
| JP | 11-147988 A | 6/1999 |
| JP | 2000-143896 A | 5/2000 |
| JP | 2000-160023 A | 6/2000 |
| JP | 2000-302955 A | 10/2000 |
| JP | 2001-310942 A | 11/2001 |
| JP | 2001-315261 A | 11/2001 |
| JP | 2002-30221 A | 1/2002 |
| JP | 2003-49023 A | 2/2003 |
| WO | WO-93/14155 A1 | 7/1993 |

*Primary Examiner*—James Seidleck
*Assistant Examiner*—John J Figueroa
(74) *Attorney, Agent, or Firm*—Birch, Stewart, Kolasch & Birch, LLP

(57) ABSTRACT

A resin comprises a resin containing a vulcanization-activating agent, or crosslinkable group-containing resin (e.g., a resin having an unsaturated bond). Moreover, a composite dispersion may be formed by a combination of a specific resin and rubber [e.g., (a) a combination of a resin, and an unvulcanized rubber containing a vulcanizing agent and a vulcanization-activating agent at a specific ratio; (b) a combination of a polyamide-series resin, and an unvulcanized rubber containing a vulcanizing agent and a polyalkenylene at a specific ratio; (c) a combination of a resin and a silicone-series unvulcanized rubber; and (d) a combination of a polyphenylene ether-series resin containing a polyalkenylene, and an unvulcanized rubber containing a sulfur or sulfur-containing organic compound as a vulcanizing agent].

The present invention provides a composite dispersion which comprises a continuous phase comprising a resin, and a dispersed phase being firmly bonded to the continuous phase and comprising a vulcanized rubber in a wide range of a combination of the resin and the rubber.

21 Claims, No Drawings

COMPOSITE DISPERSION AND PROCESS FOR PRODUCING THE SAME

TECHNICAL FIELD

The present invention relates to a composite dispersion (or composite dispersion material) comprising a resin and a rubber, and being useful for a mechanical part or a machine element, an automobile part and so on, and relates to a process for producing the same.

BACKGROUND ART

With request for higher qualities of polymeric materials, materials having multiple properties, in some cases, materials having combined properties opposite to each other have been required. In particular, in the field of industrial polymeric materials, materials having combined properties (e.g., high rigidity and impact resistance, flexibility and chemical resistance, or abrasion resistance and oil resistance) have been demanded, and the development of compositions obtained by combining various resins with vulcanized rubbers (or rubbers) has been desired.

However, materials having different properties are not usually compatible with each other, so that simple mixing of both the materials only obtains a mixture in which one component is inhomogeneously dispersed in the other. Therefore, it is difficult to give a composition having such a new property as to be a combination of properties of both the materials. If anything, such a mixture often entails deterioration in important properties as an industrial material (e.g., breaking elongation (or elongation at break), cold resistance), and in many cases it cannot become practicable technique. These defects are solved by firmly bonding the interfaces of both the components to each other in mixing of the both to give a similar effect in as the case the both being substantially compatible with each other at the interfaces.

To date, many methods for obtaining a composite of a resin member bonded to a rubber member have been proposed. In mixing a resin and a rubber, it is considered that utilization of these composite techniques ensure a new composition (composite dispersion) in which one component is dispersed in the other component uniformly and both the interfaces are enough bonded to express both properties in combination.

As a process for obtaining a composite of a rubber member bonded to a resin member, for example, a process which comprises bonding both the members by an adhesive has been known. However, in the case obtaining a composite by utilizing an adhesive, it is necessary to interpose the adhesive between the resin and the rubber intensively. However, in mixing of these three components, it is difficult to interpose the adhesive only in the interface of the rubber and the resin, and throughout the interface.

Moreover, a method bonding a resin-molded member to a rubber-molded member directly has been proposed. For example, Japanese Patent Application Laid-Open No. 25682/1975 (JP-50-25682A) discloses a process for producing a composite, which comprises rubbing a thermoplastic plastic and a vulcanized rubber compatible with the thermoplastic plastic with contacting each other to melt or fuse the surface of the plastic, and solidifying the resultant mixture with contacting the thermoplastic resin component and the vulcanized rubber component. However, in the process, it is difficult to produce an object composite.

Japanese Patent Application Laid-Open No. 124803/1997 (JP-9-124803A) discloses a process for producing a composite member, which comprises heating an acrylonitrile-containing thermoplastic resin (e.g., AS resin, ABS resin, etc.) with an acrylonitrile-containing rubber with intimately contacting each other through the use of compatibility between the thermoplastic resin and the rubber. However, this process markedly restricts species of resins and rubbers because both of them should contain acrylonitrile, and therefore the practical applications are much limited.

Japanese Patent Application Laid-Open No. 156188/1996 (JP-8-156188A) discloses a process for producing a composite member, which comprises vulcanizing an epoxy group-containing resin composition which establishes contact with an elastic rubber having a vulcanized carboxyl group or an acid anhydride group, and bonding the contact surface between the resin composition and the rubber through the use of a chemical reaction of an epoxy group with a carboxyl group. However, since this process uses the chemical reaction of the epoxy group with the carboxyl group, species of the resin and the rubber are markedly limited, and it is difficult to obtain composites widely.

Japanese Patent Application Laid-Open No. 150439/1990 (JP-2-150439A), Japanese Patent Application Laid-Open No. 133631/1991 (JP-3-133631A) and Japanese Patent Application Laid-Open No. 138114/1991 (JP-3-138114A) propose a process for producing a composite, which comprises vulcanizing a polyamide-series resin and a rubber component in the presence of a vulcanizing system, wherein the rubber component comprises a carboxyl group- or an acid anhydride group-containing rubber, a peroxide, a vulcanization-activating agent (e.g., ethylene glycol dimethacrylate, triallyl isocyanurate, etc.), and an alkoxysilane compound. In these documents, a polyamide-series resin containing the larger number of a terminal amino group than that of a terminal carboxyl group is mostly used as an aliphatic polyamide-series resin. That is, this process utilizes a reaction of an amino group with a carboxyl group or an acid anhydride group. Therefore, the species of resins and that of rubbers are markedly restricted, and it is difficult to obtain a resin-rubber composite in a wide range of the resin and the rubber.

Japanese Patent Application Laid-Open No. 11013/1995 (JP-7-11013A) discloses a process for producing a composite member of a vulcanized rubber and a polyamide molded article, by bringing a polyamide molded article into contact with a rubber compound containing a rubber, a peroxide vulcanizing agent and a silane compound and by vulcanizing them.

However, the process does not only require a silane compound but also restricts the resin to a polyamide-series resin, so that the process also has no versatility.

On the other hand, Japanese Patent Application Laid-Open No. 30221/2002 (JP-2002-30221A) discloses a thermoplastic resin composition in which a vulcanized rubber (A) is dispersed in the form of particle in a continuous phase of a thermoplastic resin (B), wherein the rubber (A) and the thermoplastic resin (B) include combinations in which a resin molded article and a rubber molded element comprising the rubber (A) are capable of adhering at such a degree of an adhesive strength that a cohesive failure occurs in a peel test, when the rubber (A) is vulcanized with bringing the resin molded article comprising the thermoplastic resin (B) into contact with the unvulcanized rubber (A) under pressure and heating.

This literature describes, as concrete combinations of a resin and a rubber in which a cohesive failure occurs, (1) a combination of at least one rubber selected from the group consisting of SBR, NR, EPDM, an acid-modified ethylene-propylene rubber and an ethylene-acrylic acid-acrylate copolymer rubber, and a polyphenylene ether (PPE) or a composition thereof; and (2) a combination of at least one rubber selected from the group consisting of an acid-modified ethylene-propylene rubber, an acid-modified nitrile rubber and a fluorine-containing rubber, and a thermoplastic resin having an amino group. Further, the reference describes that an organic peroxide is used as a rubber-vulcanizing agent in many cases, and the PPE composition may comprise 100 parts by weight of the PPE, 0 to 30 parts by weight of a polyalkenylene, and 0 to 30 parts by weight of a styrenic rubber, in the combination (1) of the PPE or the composition thereof. Moreover, it is mentioned in the literature that about 0.1 to 5 parts by weight of a vulcanization accelerator (e.g., a benzothiazole compound, triallylisocyanurate, m-phenylenebismaleimide, trimethylolpropane tri(meth)acrylate), or about 0.5 to 12 parts by weight of a polyalkenylene (e.g., a polyoctenylene) as a processing synergist is added to 100 parts by weight of the rubber.

However, in a method mentioned in the literature, it is difficult to find a combination of a resin and a rubber with a cohesive failure, and the combination of the resin and the rubber is significantly restricted. Moreover, even when such a combination is selected, an adhesive strength between a continuous phase and a dispersed phase is not enough in many cases.

It is therefore an object of the present invention to provide a composite dispersion (or a composited dispersion) which comprises a continuous phase comprising a resin, and a dispersed phase being bonded to the continuous phase and comprising a vulcanized rubber in a wide range of combination of the resin and the rubber, and a process for producing the same.

It is another object of the present invention to provide a process for producing a composite dispersion, by a convenient process, which comprises a resin phase and a vulcanized rubber phase being firmly bonded to the resin phase.

It is still another object of the present invention to provide a composite dispersion capable of imparting a rubber property to a resin matrix effectively, and a process for producing the same.

It is a further object of the present invention to provide a molded article formed from a composite dispersion which comprises a resin phase and a vulcanized rubber phase being firmly bonded to the resin phase.

DISCLOSURE OF THE INVENTION

The inventors of the present invention made intensive studies to achieve the above objects and finally found that, in a composite dispersion formed by bonding a resin phase to a rubber phase, (1) use of a resin containing a vulcanization accelerator or a crosslinkable resin, or (2) combination use of a specific resin and a rubber insures that the resin phase is directly bonded to the vulcanized phase certainly and firmly. The present invention has been accomplished based on the above findings.

That is, the composite dispersion (1) of the present invention comprises a continuous phase comprising a resin, and a dispersed phase being directly bonded to the continuous phase and comprising a vulcanized rubber formed by vulcanizing an unvulcanized rubber, wherein the continuous phase comprises a resin containing a vulcanization-activating agent, or a crosslinkable group-containing resin. Incidentally, the term "directly bonded" means that "a resin phase is bonded to a vulcanized rubber phase without an adhesive, and mechanical peeling of the both sheet-like phases progresses along with a cohesive failure of the rubber phase".

The crosslinkable group-containing resin may be, for example, a thermoplastic resin having an unsaturated bond (e.g., a thermoplastic resin having an unsaturated bond in a proportion of about 0.01 to 6.6 mol relative to 1 kg of the thermoplastic resin). The thermoplastic resin having an unsaturated bond may be (i) a resin produced by a reaction of a polymerizable compound having a reactive group (A) and an unsaturated bond with a thermoplastic resin having a reactive group (B) which is reactive to the reactive group (A), or (ii) a thermoplastic resin into which an unsaturated bond is introduced by copolymerization or copolycondensation.

The resin may comprise at least one member selected from the group consisting of a polyamide-series resin (e.g., an aliphatic polyamide-series resin), a polyester-series resin (e.g., an aromatic polyester-series resin), a poly(thio)ether-series resin (e.g., a polyphenylene ether-series resin, and a polysulfide-series resin), a polycarbonate-series resin, a polyimide-series resin, a polysulfone-series resin, a polyurethane-series resin, a polyolefin-series resin, a halogen-containing resin, a styrenic resin, a (meth)acrylic resin, and a thermoplastic elastomer; or a resin having at least two atoms on the average per molecule, and each of atoms is selected from a hydrogen atom and/or a sulfur atom and has an orbital interaction energy coefficient S of not less than 0.006, wherein the orbital interaction energy coefficient S is represented by the following formula (1):

$$S = (C_{HOMO,n})^2 / |E_c - E_{HOMO,n}| + (C_{LUMO,n})^2 / |E_c - E_{LUMO,n}| \quad (1)$$

in the formula, each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of a radical-generating agent, $C_{HOMO,n}$ representing a molecular-orbital coefficient of the highest occupied molecular orbital (HOMO) of an n-th hydrogen atom and/or sulfur atom constituting a basic unit of the resin, $E_{HOMO,n}$ representing an orbital energy (eV) of the HOMO, $C_{LUMO,n}$ representing a molecular-orbital coefficient of the lowest unoccupied molecular orbital (LUMO) of the n-th hydrogen atom and/or sulfur atom constituting the basic unit of the resin, and $E_{LUMO,n}$ representing an orbital energy (eV) of the LUMO.

In the composite dispersion (1), the vulcanized rubber may comprise a diene-series rubber, an olefinic rubber, an acrylic rubber, a fluorine-containing rubber, a silicone-series rubber, a urethane-series rubber, and others. At least the unvulcanized rubber may contain a vulcanizing agent (e.g., a radical-generating agent such as an organic peroxide, an azo compound and a sulfur-containing organic compound, and a sulfur). The proportion of the vulcanizing agent may be about 0.1 to 10 parts by weight relative to 100 parts by weight of the unvulcanized rubber. Moreover, the vulcanization-activating agent may comprise at least one member selected from the group consisting of an organic compound having at least two polymerizable unsaturated bonds per molecule, and a maleimide-series compound. The proportion of the vulcanization-activating agent may be about 0.1 to 10 parts by weight relative to 100 parts by weight of the resin. Further, at least one component selected from the group consisting of the resin and the unvulcanized rubber may contain a polyalkenylene. The proportion of the polyalkenylene may be about 1 to 30 parts by weight relative to 100 parts by weight of the resin or the unvulcanized rubber.

In the composite dispersion (2), a combination of the resin and/or the unvulcanized rubber may be any one of the following combinations (a) to (d). Incidentally, in these combinations, the resin may have at least two atoms on the average per molecule, and each of the atoms is selected from a hydrogen atom and/or a sulfur atom and has the orbital interaction energy coefficient S of not less than 0.006. Moreover, the unvulcanized rubber may contain a vulcanization-activating agent or a polyalkenylene.

(a) a combination of a resin, and an unvulcanized rubber containing a vulcanizing agent and a vulcanization-activating agent, wherein the weight ratio of the vulcanizing agent relative to the vulcanization-activating agent [the former/the latter] is 2/98 to 70/30;

(b) a combination of a polyamide-series resin, and an unvulcanized rubber containing a vulcanizing agent and a polyalkenylene, wherein the weight ratio of the vulcanizing agent relative to the polyalkenylene [the former/the latter] is 2/98 to 45/55;

(c) a combination of a resin and a silicone-series unvulcanized rubber; and (d) a combination of a polyphenylene ether-series resin containing a polyalkenylene, and an unvulcanized rubber containing a sulfur or a sulfur-containing organic compound as a vulcanizing agent.

In the composite dispersion of the present invention, the resin and/or the unvulcanized rubber may have a molecular weight of not more than 1000, and may comprise at least one member selected from the group consisting of the following compounds: a compound having two hydrogen atoms on the average per molecule, each atom having the orbital interaction energy coefficient S of not less than 0.006; a compound having not less than one group selected from the group consisting of a carboxyl group, an acid anhydride group and an isocyanate group per molecule; and a silane coupling agent. Moreover, in the composite dispersion of the present invention, the continuous phase and the dispersed phase may form an islands-in-an ocean structure. The weight ratio of the continuous phase relative to the dispersed phase may be about 25/75 to 98/2.

The present invention includes a process for producing the composite dispersion, which comprises kneading a resin and an unvulcanized rubber to give the composite dispersion, and a shaped article which is formed from the composite dispersion.

Incidentally, in the present invention, the resin includes a graft copolymer containing a rubber component (for example, HIPS, ABS resin).

DETAILED DESCRIPTION OF THE INVENTION

The composite dispersion of the present invention comprises a continuous phase comprising a resin (sometimes simply referred to as a resin phase), and a dispersed phase being bonded to the continuous phase and comprising a vulcanized rubber obtained by vulcanizing an unvulcanized rubber (sometimes simply referred to as a rubber phase). In one embodiment of the present invention, a resin is firmly bonded to a rubber by using a resin containing a vulcanization-activating agent or a crosslinkable group-containing resin as the resin in the composite dispersion. Moreover, in other embodiment of the present invention, the composite dispersion comprises a specific resin and a rubber in combination.

[Resin]

As the resin constituting the continues phase, a thermoplastic resin or the like may be used.

The thermoplastic resin includes, for example, a condensation-series thermoplastic resin [e.g., a polyamide-series resin, a polyester-series resin, a polyurethane-series resin, a poly(thio)ether-series resin (e.g., a polyacetal-series resin, a polyphenylene ether-series resin, a polysulfide-series resin, a polyether ketone-series resin), a polycarbonate-series resin, a polyimide-series resin, a polysulfone-series resin, or a polyurethane-series resin]; a vinyl polymerizable thermoplastic resin [e.g., a polyolefinic resin, a (meth)acrylic resin, a styrenic resin, a halogen-containing resin, a vinyl-series resin (e.g., a polyvinyl acetate, a polyvinyl alcohol)]; a thermoplastic elastomer; and the like.

These resins may be used singly or in combination. When two or more species of the resins are used, a resin composition may form a composite resin composition such as a polymer alloy.

(Crosslinkable Group-containing Resin)

The crosslinkable group-containing resin (or a resin having a crosslinkable group) (hereinafter, sometimes referred to as a crosslinkable resin) includes, for example, a thermoplastic resin having an unsaturated bond (polymerizable or crosslinkable unsaturated bond). With the use of such a crosslinkable resin, since a crosslinking reaction also progresses at an interface between a rubber component and a resin component in vulcanization of the rubber component, even if a rubber component in a wide extent is selected as the rubber component, a resin phase can firmly bond to a rubber phase (or a vulcanized rubber phase).

In a thermoplastic resin having an unsaturated bond, the unsaturated bond is not particularly restricted to a specific bond as far as the unsaturated bond can be activated by a vulcanizing agent such as a radical-generating agent, there may be exemplified various bonds (particularly polymerizable unsaturated bonds) showing crosslinkable ability or polymerizable ability by imparting of heat or light. Such an unsaturated bond or a unit having an unsaturated bond may bond to a thermoplastic resin through a connection group [e.g., an ester bond (—OC(=O)—, —C(=O)O—), an amide bond (—NHCO—, —CONH—), an imino bond (—NH—), aurethane bond (—NHC(=O)O—), a urea bond, a biuret bond]. Further, the unsaturated bond or the unit may be located either in a terminal of the resin (terminal of a main chain) and/or in a side chain of the resin, or in a main chain of the resin. Furthermore, the unsaturated bond or the unit may be located in a terminal and/or side chain of the resin, in a main chain of the resin, or both.

As the group having an unsaturated bond, there may be exemplified, for example, a $C_{2-6}$alkenyl group such as vinyl group, 1-propenyl group, isopropenyl group, 1-butenyl group, allyl group, 2-methyl-2-propenyl group, or 2-butenyl group; a $C_{2-6}$alkenyl-$C_{6-20}$aryl group such as 4-vinylphenyl group, or 4-isopropenylphenyl group; a $C_{6-20}$aryl-$C_{2-6}$alkenyl group such as styryl group; a $C_{2-6}$alkynyl group such as ethynyl group, 1-propynyl group, 1-butynyl group, propargyl group, 2-butynyl group, or 1-methyl-2-propynyl group; a vinylene group which may have a substituent, for example, vinylene group, a mono- or di-$C_{1-6}$alkylvinylene group such as methylvinylene group, ethylvinylene group or 1,2-dimethylvinylene group, and a halovinylene group such as a chlorovinylene group; a vinylidene group; an ethynylene group; and the like.

Concrete embodiments of the thermoplastic resin having an unsaturated bond can be illustrated by the following embodiments such as (i) to (iii):

(i) a resin produced by a reaction of a polymerizable compound having a reactive group (A) and an unsaturated bond with a thermoplastic resin having a reactive group. (B) which is reactive to the reactive group (A), (ii) a thermoplastic resin into which an unsaturated bond is introduced by copolymerization or copolycondensation, and (iii) a thermoplastic resin into which an unsaturated bond is introduced by various organic reactions (e.g., introduction of a vinyl group by Reppe reaction using acetylene, introduction of an unsaturated bond using an organic metal reagent such as vinyl lithium, introduction of an unsaturated bond by coupling reaction).

Among these resins, the preferred unsaturated bond-containing resin is the foregoing resin (i) or (ii).

In the resin (i), an unsaturated bond can be introduced into a resin by a reaction of a polymerizable compound having at least one reactive group (A) and at least one unsaturated bond, with a resin having a reactive group (B) which is reactive to the reactive group (A) in the polymerizable compound.

As such a representative reactive group (A) in a polymerizable compound, there may be mentioned, for example, (A1) hydroxyl group, (A2) carboxyl group or acid anhydride group thereof, (A3) amino group, (A4) epoxy group, (A5) isocyanate group, and the like. As the combination of a reactive group (A) in a polymerizable compound with a reactive group (B) in a resin, the following combinations can be exemplified. Incidentally, words in the parentheses show a bond form (type or mode) between the reactive group (A) and the reactive group (B).

(A1) hydroxyl group:
(B) carboxyl group or acid anhydride group thereof (ester bond), isocyanate group (ester bond)
(A2) carboxyl group or acid anhydride group thereof:
(B) hydroxyl group (ester bond), amino group (amide bond), epoxy group (ester bond), isocyanate group (amide bond)
(A3) amino group:
(B) carboxyl group or acid anhydride group thereof (amide bond), epoxy group (imino bond), isocyanate group (amide bond)
(A4) epoxy group:
(B) carboxyl group or acid anhydride group thereof (ester bond), amino group (imino bond)
(A5) isocyanate group:
(B) hydroxyl group (ester bond), carboxyl group or acid anhydride group thereof (amide bond), amino group (amide bond)

The polymerizable compound can be exemplified by a hydroxyl group-containing compound [e.g., a $C_{3-6}$alkenol such as allylalcohol, 2-buten-1-ol or 3-buten-2-ol; a $C_{3-6}$alkynol such as propargyl alcohol; a $C_{2-6}$alkylene glycol mono(meth)acrylate such as 2-hydroxyethyl(meth)acrylate, 2-hydroxypropyl(meth)acrylate, or butanediol mono(meth)acrylate; a polyoxy$C_{2-6}$alkylene glycol mono(meth)acrylate such as diethylene glycol mono(meth)acrylate; a $C_{2-6}$alkenylphenol such as 4-hydroxystyrene or 4-hydroxy-α-methylstyrene; dihydroxystyrene; vinylnaphthol], a compound containing a carboxyl group or an acid anhydride group thereof [e.g., a $C_{3-6}$alkene-carboxylic acid such as (meth)acrylic acid, crotonic acid or 3-butene acid; a $C_{4-8}$alkene-dicarboxylic acid or an anhydride thereof such as itaconic acid, maleic acid or maleic anhydride; an unsaturated aromatic carboxylic acid such as vinyl benzoic acid; cinnamic acid], a compound containing an amino group (e.g., a $C_{3-6}$ alkenylamine such as allylamine, 4-aminostyrene, diaminostyrene), a compound containing an epoxy group (e.g., allyl glycidyl ether, glycidyl(meth)acrylate), a compound containing an isocyanate group (e.g., vinylisocyanate) and the like.

Incidentally, in the resin (i), the resin may be reformed or modified by being introduced a reactive group (B). As the method for introducing the reactive group (B) into the resin, there may be utilized: (i-1) a method copolymerizing a monomer having a reactive group (B) (such as the above-exemplified polymerizable compound) with a resin material (or a monomer or oligomer, the resin raw materials) in the resin production, and (i-2) various organic reactions such as an oxidative reaction for introduction of a carboxyl group, a halogenation method, a graft method of a polymerizable monomer. Incidentally, in the vinyl polymerizable resins, the reactive group (B) is usually introduced (into the resin) with the use of a monomer having the reactive group (B) as a copolymerizable component, and in any resins including the vinyl polymerizable resins, the reactive group (B) can be easily introduced by graft reaction of the polymerizable compound having the reactive group.

In the resin (ii), as a method for introducing an unsaturated bond, there may be mentioned, for example, a method which comprises copolycondensing (or copolymerizing) a compound having a polyfunctional unsaturated bond as a part of a reactive component (comonomer) [e.g., an unsaturated polycarboxylic acid (or an unsaturated polybasic carboxylic acid) such as an aliphatic unsaturated dicarboxylic acid (e.g., a $C_{4-10}$ aliphatic unsaturated dicarboxylic acid such as maleic acid, maleic anhydride, fumaric acid, itaconic acid, itaconic anhydride, citraconic acid, citraconic anhydride, or methaconic acid); an unsaturated polyhydric alcohol such as an aliphatic unsaturated diol (e.g., a $C_{4-10}$ aliphatic unsaturated diol such as 2-buten-1,4-diol)] in a production of a condensation-series resin (such as a polyamide-series resin, a polyester-series resin). Moreover, in an addition polymerization-series resin (such as an olefinic resin), there may be exemplified a method which comprises copolymerizing a monomer having a conjugated unsaturated bond (e.g., a conjugated $C_{4-10}$ alkadiene which may have a substituent, such as 1,3-butadiene, 2-methyl-1,3-butadiene, 2,3-dimethyl-1,3-butadiene, or chloroprene) as a part of a reactive component (comonomer).

The resin(s) having an unsaturated bond may be used singly or in combination. Moreover, the resin having an unsaturated bond may contain a resin (a) which is free from an unsaturated bond. The resin (a) is not particularly limited, and includes various thermoplastic resins [for example, a thermoplastic resin as described below (e.g., a polyamide-series resin, and a polyester-series resin)].

The proportion of the resin (a) may for example be about 10 to 3000 parts by weight, preferably about 15 to 2000 parts by weight, and more preferably about 30 to 500 parts by weight (e.g., about 50 to 300 parts by weight) relative to 100 parts by weight of the resin having an unsaturated bond.

The number of the unsaturated bond is, for example, not less than 0.1 (e.g., about 0.1 to 1000) on the average per molecule of the resin, preferably not less than 1 (e.g., about 1 to 100) on the average, and more preferably not less than 2 (e.g., about 2 to 50) on the average. Moreover, the concentration of the unsaturated bond is, for example, about 0.001 to 6.6 mole relative to 1kg of resin, preferably about 0.01 to 4 mole, and more preferably about 0.02 to 2 mole.

(Resin having an Active Atom)

The resin to be used in the present invention may have an atom showing high activity to a radical-generating agent (hereinafter, referred to as an active atom). Such an active atom can increase an activity of a resin to a vulcanizing agent in the case using a radical-generating agent as a vulcanizing agent, and insures improvement in adhesive strength between the resin and the rubber.

Concretely, the resin may be selected depending on the species of the radical-generating agent, and may for example have an active atom (e.g., an active hydrogen atom, an active sulfur atom) having an orbital interaction energy coefficient S represented by the following formula (1) of not less than a given value (e.g., 0.006, and preferably 0.008). The preferred value of the orbital interaction energy coefficient S of the active atom is about 0.006 to 0.06, and preferably about 0.007 to 0.05 (in particular about 0.01 to 0.045). The number of the active atom depends on a bonding position or site of a functional group having the active atom (e.g., an end or terminal, a branched chain, or a main chain), and the number of the active atom per molecule of the resin is, for example, not less than 2 (about 2 to 10000) on the average, preferably not less than 2.5 (about 2.5 to 5000) on the average, and more preferably not less than 3 (about 3 to 1000) on the average. The number of the active atom per molecule of the resin is usually about 2 to 100 (preferably about 2.5 to 50, more preferably about 3 to 25, and particularly about 3 to 20).

$$S=(C_{HOMO,n})^2/|E_c-E_{HOMO,n}|+(C_{LUMO,n})^2/|E_c-E_{LUMO,n}| \quad (1)$$

wherein each of the factors, $E_c$, $C_{HOMO,n}$, $E_{HOMO,n}$, $C_{LUMO,n}$, and $E_{LUMO,n}$ representing a value calculated by the semiempirical molecular orbital method MOPACPM3, $E_c$ representing an orbital energy (eV) of a radical of a radical-generating agent; $C_{HOMO,n}$ representing a molecular-orbital coefficient of the highest occupied molecular orbital (HOMO) of an n-th hydrogen atom and/or sulfur atom constituting a basic (or constitutive) unit of the resin; $E_{HOMO,n}$ representing an orbital energy (eV) of the HOMO; $C_{LUMO,n}$ representing a molecular-orbital coefficient of the lowest unoccupied molecular orbital (LUMO) of the n-th hydrogen atom and/or sulfur atom constituting the basic unit of the resin; and $E_{LUMO,n}$ representing an orbital energy (eV) of the LUMO.

MOPACPM3 represented by the formula (1) is one of molecular orbital (MO) methods. The molecular orbital method is one of approximations for discussing an electron condition or state in a molecular, and is classified into three main methods; an empirical method such as Huckel's rule, a semiempirical method enhancing an approximation of the Huckel's rule, and an nonempirical method determining strictly a molecular orbital function by only calculation. In recent years, with developing a computer system, the semiempirical method and the nonempirical method are main methods. The molecular orbital method is a most convincible method correlating a molecular structure and chemical reactivity thereof. For example, when searching the term "molecular orbital method" as a keyword in JST Online Information System (JOIS), about 53000 of a registered number can be found (term: 1980 to 2000 May). The MOPACPM3 is the core of NDDO (Neglect of Diatomic Differential Overlap) method which is one of the semiempirical methods.

The MOPACPM3 is used for mainly studying a reaction of an organic compound, and is explained in many literatures and publications [e.g., "Molecular orbital method MOPAC guidebook" (Tsuneo Hirano, Kazutoshi Tanabe; Kalbundo, 1991), "Introduction to Quantum Chemistry, 3rd revised edition" (Teijiro Yonezawa et al., Kagaku Dojin, 1983), "Calculation Chemistry guidebook" (translated by Eiji Osawa et al., written by Tim Clark, Maruzen, 1985)].

A basic unit (or constitutive unit) in the formula (1) means a modeling molecular structure comprising a polymer terminal and about 1 to 3 repeating unit (s). That is, it is difficult to calculate a molecular orbital for a polymer compound itself by MOPACPM3, since the polymer compound has too much numbers of atoms per molecule. Therefore, a calculation may be carried out for a modeling molecular structure (a constitutive unit or basic unit) comprising a polymer terminal and about 2 to 3 repeating units. For example, a molecular structure (repeating unit) of a polybutylene terephthalate (PBT) is generally represented by a chemical formula "—$(CH_2—CH_2—CH_2—CH_2—O—C(=O)—C_6H_4—C(=O)—O)_n$—", and the calculation of a molecular orbital in the formula (1) may be conducted for "HO—$CH_2—CH_2—CH_2—CH_2—O—C(=O)—C_6H_4—C(=O)—OH$" as a basic unit.

The orbital interaction energy coefficient S represented by the formula (1) may be referred to as a reactive index, and is defined and explained in various publications. When a chemical reactivity is discussed, the orbital interaction energy coefficient S is used as a parameter for the chemical reactivity in general. For example, "Introduction of Frontier orbital theory" (p. 72, Shinichi Yamabe, Satoshi Inagaki, Kodansha Scientific, 1989) describes that an orbital interaction energy coefficient S indicates a concept "Regarding to an interaction between two orbits, (a) a smaller energy difference between two orbits and (b) a larger overlap between two orbits make the interaction stronger". The formula (1) is based upon an idea of super delocalizability (Sr) published in 1954 by late Dr. Fukui given a Nobel prize (see "To use a molecular orbital method", p. 71, Minoru Imoto, Kagaku Dojin, 1986), a formula similar to the formula (1) is derived from the concept of Sr on various publications and literatures.

Hereupon, it is important that the molecular orbital method is already widely known for discussion of a molecular structure and chemical reactivity thereof. Therefore, an orbital interaction energy coefficient S (1/eV) defined by the formula (1) does not represent a mere conceptual value, and represents a value meaning a parameter or properties of a material (e.g., a molecular weight, a functional group) for determination of the material.

Incidentally, the radical orbital energy $E_C$ (eV) of a radical-generating agent is preferably calculated based on a radical molecular structure with the use of MOPACPM3, and a predetermined value based on a species of the radical-generating agent may be used for convenience. For example, the $E_C$ value of the radical-generating agent may be −8 eV for an organic peroxide, −5 eV for an azo compound, and −6 eV for a sulfur-containing organic compound excluding a sulfur.

As the hydrogen atom having not less than a predetermined value (e.g., 0.006) of an orbital interaction energy coefficient S (an active hydrogen atom) in the case where the radical-generating agent comprises an organic peroxide, there may be mentioned, for example, a hydrogen atom constituting an amino group (—$NH_2$) (e.g., a terminal amino group), an imino group (—NH—) (e.g., a main-chain or terminal imino group, —NH— of an amide bond), a methyl group (—$CH_3$), a methylene group (—$CH_2$—) (a methylene group in a main chain, or terminal methylene group), or a methylidyne group (—CH=) (a main-chain or terminal methylidyne group).

As the sulfur atom having not less than a predetermined value (e.g., 0.006) of an orbital interaction energy coefficient S (an active sulfur atom), in the case where the radical-generating agent comprises an organic peroxide, there may be mentioned, for example, a sulfur atom constituting a thio group (—S—), a mercapto group (—SH), an alkylthio group (e.g., a $C_{1-4}$alkylthio group such as a methylthio group, or an ethylthio group), or a sulfinyl group (—SO—).

The methyl group includes, for example, a methyl group bonding to an alkylene chain, a cycloalkylene chain, or an aromatic ring; a methyl group bonding to an oxygen atom (e.g., a methyl group in a methoxy group). The methylene group may include, for example, a methylene group of a linear or branched alkylene group forming a main chain or side chain, a methylene group of a (poly)oxyalkylene unit such as a (poly)oxymethylene unit or a (poly)oxyethylene unit, and a methylene group adjacent to a nitrogen atom of an amino group or an imino group. The methylidyne group includes, for example, an α-positioned methylidyne group adjacent to an amino group or an imino group, such as a methylidyne group α-positioned to an amino group in an aminocycloalkyl group.

It is sufficient that a resin having an active atom has plural (e.g., not less than 2 on average) active atoms per molecule. That is, usually the resin is not constituted by a single molecule, and comprises a mixture of numerous molecules being somewhat different in a structure and a chain length. Therefore, all molecules of the resin are not required essentially to have a plurality of active atoms, and the number of an active atom on average per molecule is to be not less than 2 in calculating a plurality of predictable predominant constitutive or basic units. For example, the number of an active hydrogen atom constituting a polymer having a repeating unit —(NH—$(CH_2)_6$—NH—C(=O)—$(CH_2)_4$—C(=O))$_n$— (polyamide 66) may be calculated based on a modeling basic unit $NH_2$—$(CH_2)_6$—NH—C(=O)—$(CH_2)_4$—C(=O)—OH, and when a radical-generating agent comprises an organic peroxide, two hydrogen atoms of a terminal $NH_2$ group comprise an active hydrogen atom (that is, S is not less than 0.006). In this case, the average number N of an active hydrogen atom per polyamide 66 molecule may be calculated with the use of the following formula (2) from a ratio of a terminal $NH_2$ group and a terminal COOH group in the polymer (polyamide 66) as an aggregate;

$$N=2\times A \qquad (2)$$

wherein "A" represents the average number of a terminal $NH_2$ group per molecule.

For example, in a ratio of a terminal $NH_2$ group/terminal COOH group=1/1 (molar ratio) in the resin, the number "A" of the terminal $NH_2$ group per molecule is 1, and the number "N" of the active hydrogen atom per molecule is equal to 2. Moreover, in 1/2 (molar ratio) of terminal $NH_2$ group/terminal COOH group, the number "A" of the terminal $NH_2$ group per molecule shows 2/3, and the number "N" of the active hydrogen atom per molecule is 4/3.

Incidentally, in the case where the resin is a mixed resin comprising a plurality of resins which are different from each other in the number of active atoms, the number of active atoms in the mixed resin may be represented by the average number of active atoms in each resin. That is, the apparent number of active atoms in the mixed resin can be estimated by calculating the number of active atoms individually based on a basic unit for each resin constituting the mixed resin, and averaging the calculated number of the active atom according to a proportion (weight ratio) of each resin. For example, when the mixed resin comprises (A) the above mentioned polyamide 66 (N=2) and (B) the above mentioned polyamide 66 (N=4/3), and the molar ratio of (A)/(B) is 1/1, the number "N" of the active atom per molecule of the mixed resin can be counted as 5/3. Moreover, when the mixed resin comprises (A) the above mentioned polyamide 66 (N=2) and (C) a polyamide 66 having carboxyl group as all terminal groups (N=0) and the molar ratio of (A)/(C) is 3/1, the number "N" of the active atom per molecule of the mixed resin can be counted as 3/2.

As the thermoplastic resin having such an active atom, there may be exemplified, among the above-mentioned resins, a polyamide-series resin, a polyester-series resin, a polyacetal-series resin, a polyphenylene ether-series resin, a polysulfide-series resin, a polyolefinic resin, a polyurethane-series resin, a thermoplastic elastomer, an amino-series resin and the like.

Moreover, even when a resin does not have the plural active atoms mentioned above, the resin can be utilized as a modified resin by introducing an active atom (e.g., an amino group, an oxyalkylene group, etc.) into the resin. Such a thermoplastic resin includes, for example, a vinyl polymerization-series resin [e.g., a (meth)acrylic resin (e.g., a poly(methyl methacrylate), a methyl methacrylate-styrene copolymer (MS resin)., a polyacrylonitrile resin, etc.); a styrenic resin (e.g., a polystyrene; a styrenic copolymer such as a AS resin and a styrene-methyl methacrylate copolymer; a styrenic grafted copolymer such as HIPS and ABS resin), a homopolymer or copolymer comprising a halogen-containing monomer (e.g., a polyvinyl chloride, a vinylidene chloride copolymer), a vinyl-series resin (e.g., a polyvinyl acetate, a polyvinyl alcohol)], a condensation-series resin [e.g., a polycarbonate (e.g., a bisphenol A-based polycarbonate resin), a polyimide-series resin, a polysulfone-series resin, a polyether sulfone-series resin, a polyether ether ketone-series resin, a polyarylate-series resin], and other resins.

In the vinyl polymerization-series resin, a modified resin may be obtained by introducing an amino group into a resin, and, for example, may be produced by copolymerization of a vinyl monomer and a monomer containing a carboxyl group or an acid anhydride group such as (meth)acrylic acid and maleic anhydride to introduce a carboxyl group or an acid anhydride group into the vinyl polymerization-series resin, and, if necessary, reacting the resulting resin with thionyl chloride to produce an acid chloride group, and reacting the resultant with ammonia, a mono-substituted amine (e.g., a monoalkylamine, a monoarylamine) or the diamine mentioned above to introduce an amino group into the resin. Further, a copolymerization of a (poly)oxyalkylene glycol mono(meth)acrylate or a (poly)oxyalkylene glycol monoalkylether(meth)acrylate with the vinyl monomer, or a graft-polymerization of the mono(meth)acrylate to the vinyl polymerization-series resin may introduce the active hydrogen atom for a modification of the vinyl polymerization-series resin.

Further, for the condensation-series resin as well as the vinyl polymerization-series resin, a modified resin may be obtained by introducing an amino group into a resin, and a modification may be carried out by graft-polymerizing a carboxyl group- or an acid anhydride group-containing monomer with a resin to introduce the carboxyl group or the acid anhydride group into the resin, if necessary, by reacting the resulting resin with thionyl chloride to produce an acid chloride group, and by reacting the acid chloride group with ammonia, a mono-substituted amine, or the diamine mentioned above to introduce an amino group as same manner as in the above vinyl polymerization-series resin.

Moreover, the resin may comprise a resin composition comprising a resin (or a modified resin) containing a given concentration of the active atom, and other resins. As other thermoplastic resins, there may be mentioned an unmodified thermoplastic resin corresponding to the modified resin such as a styrenic resin, a (meth)acrylic resin, a homopolymer or copolymer of a halogen-containing monomer (e.g., a fluorine-containing resin), a vinyl-series resin, a polycarbonate-series resin, a polyimide-series resin, a polysulfone-series resin, a polyether sulfone-series resin, a polyether ether ketone-series resin, a polyarylate-series resin, a liquid-crystal polyester resin, and the like.

In the case of an addition polymerization-series resin such as a radical polymerization (e.g., an unsaturated polyester, a vinylester-series resin, a diallyl phthalate resin, etc.) wherein the concentration of the active atom is low, the active atom may be introduced into the resin by the copolymerization with a monomer having the active atom. As such a monomer having the active atom, there may be mentioned, for example, a monomer having an oxy$C_{2-4}$alkylene unit [e.g., a (poly)oxyalkylene glycol mono(meth)acrylate such as a (poly)oxyethylene glycol mono(meth)acrylate; a (poly)oxyalkylene glycol monoalkylether(meth)acrylate such as a (poly)oxyethylene glycol monomethylether(meth)acrylate; a multifunctional monomer (e.g., a (poly)oxyalkylene glycol di(meth)acrylate such as a (poly)oxyethylene glycol di(meth)acrylate, a di(meth)acrylate of a bisphenol A alkylene oxide-adduct, etc.)], a monomer having an amide bond such as an acrylamide (an acrylamide, a methylene-bis(meth)acrylamide, a 1,1-bisacrylamide-ethane, etc.).

The proportion of the resin having the active atom may be about 30 to 100% by weight, preferably about 50 to 100% by weight, and more preferably about 80 to 100% by weight, relative to the total amount of the resin components.

Hereinafter, resins available in the present invention will be described in detail.

(Thermoplastic Resin)

(1) Polyamide-series Resin

The polyamide-series resin has an amide bond owing to polycondensation between a carboxyl group and an amino group, and includes, for example, an aliphatic polyamide-series resin, an alicyclic polyamide-series resin, and an aromatic polyamide-series resin. The aliphatic polyamide-series resin is usually employed. The aliphatic polyamide-series resin includes a condensed compound of an aliphatic diamine component (e.g., a $C_{4-10}$alkylene diamine such as tetramethylenediamine, hexamethylenediamine) and an aliphatic dicarboxylic acid component (e.g., a $C_{4-20}$alkylene dicarboxylic acid such as adipic acid, sebacic acid and dodecanedioic acid), for example, a polyamide 46, a polyamide 66, a polyamide 610, a polyamide 612, a polyamide 1010, a polyamide 1012, a polyamide 1212; a homopolymer or a copolymer of a lactam (e.g., a $C_{4-20}$lactam such as ε-caprolactam, ω-laurolactam) utilizing a ring-opening polymerization of the lactam, or a homopolymer or copolymer of an aminocarboxylic acid (e.g., a $C_{4-20}$aminocarboxylic acid such as ω-aminoundecanoic acid), for example, a polyamide 6, a polyamide 11, a polyamide 12; a copolyamide obtained by copolymerizing these polyamide components (e.g., a polyamide 6/11, a polyamide 6/12, a polyamide 66/11, a polyamide 66/12) and the like.

As the alicyclic polyamide-series resin, there may be exemplified a polyamide in which an alicyclic diamine and/or an alicyclic dicarboxylic acid replaces at least part of the aliphatic diamine component and/or the aliphatic dicarboxylic acid component. The alicyclic polyamide includes, for example, a condensed compound of the aliphatic dicarboxylic acid component and an alicyclic diamine component [for example, a $C_{5-8}$cycloalkyl diamine such as cyclohexyl diamine; a bis(amino$C_{5-8}$cycloalkyl)alkane (e.g., a bis(aminocyclohexyl)alkane such as bis(aminocyclohexyl) methane or 2,2-bis(aminocyclohexyl)propane)].

As the aromatic polyamide-series resin, there may be mentioned, a polyamide in which at least one component among the aliphatic diamine components and the aliphatic dicarboxylic acid components comprises an aromatic component. The aromatic polyamide includes, for example, a polyamide in which the diamine component is substituted for an aromatic component [e.g., a condensed compound of MXD-6 and an aliphatic dicarboxylic acid]; a polyamide in which the dicarboxylic acid component comprises an aromatic component [e.g., a condensed compound of an aliphatic diamine (e.g., trimethylhexamethylenediamine) and an aromatic dicarboxylic acid (e.g., terephthalic acid, isophthalic acid)]; a polyamide in which both the diamine component and the dicarboxylic acid component comprise an aromatic component [e.g., a fully aromatic polyamide such as a poly(m-phenyleneisophthalamide (e.g., Aramid)], and others.

The polyamide-series resin further includes a polyamide comprising a dimeric acid as the dicarboxylic acid component, a polyamide having a branched structure by introducing a small amount of a polyfunctional polyamine and/or a polycarboxylic acid component, a modified polyamide (e.g., an N-alkoxymethylpolyamide), a high crush proof (high impact) polyamide obtained by mixing or graft-polymerizing a modified polyolefin, and a polyamide elastomer having a polyether as a soft segment.

In the polyamide-series resin, an active hydrogen atom includes, for example, a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), in particular the hydrogen atom of the terminal amino group.

In the polyamide-series resin, the proportion of a terminal $NH_2$ group relative to a terminal COOH group is not particularly restricted, and may be, for example, selected from the range of about 10/90 to 100/0, preferably about 20/80 to 95/5, and more preferably about 25/75 to 95/5 as a molar ratio of terminal amino group/terminal carboxyl group, when the active hydrogen atom comprises a hydrogen atom of the terminal amino group and a hydrogen atom bonding to the α-positioned carbon atom. Moreover, in the case where the active hydrogen atom comprises only hydrogen atoms of the terminal amino group, the ratio (molar ratio) of terminal amino group/terminal carboxyl group, maybe about 50/50 to 100/0, preferably about 60/40 to 95/5, and more preferably about 70/30 to 95/5.

Moreover, in the polyamide-series resin, in the case introducing an unsaturated bond as the resin (i), for example, a residual carboxyl group or a residual amino group may be utilized as the reactive group (B), and in the case introducing the unsaturated bond as the resin (ii), the unsaturated polycarboxylic acid such as maleic acid may be utilized as part of the copolymerizable component.

(2) Polyester-series Resin

The polyester-series resin includes, for example, an aliphatic polyester-series resin, and an aromatic polyester-series resin. As the polyester-series resin, an aromatic polyester-series resin (for example, a polyalkylene arylate-series resin or a saturated aromatic polyester-series resin) is usually employed. The aromatic polyester-series resin includes, for example, a poly$C_{2-4}$alkylene terephthalate such as a polyethylene terephthalate (PET) or a polybutylene terephthalate (PBT); a poly$C_{2-4}$alkylene naphthalate corresponding to the polyalkylene terephthalate (e.g., a polyethylene naphthalate); 1,4-cyclohexyldimethylene terephthalate (PCT). The polyester-series resin may be a copolyester comprising an alkylene arylate unit as a predominant or main component (e.g., not less than 50% by weight). A copolymerizable component of the copolyester includes a $C_{2-6}$alkylene glycol such as ethylene glycol, propylene glycol, butanediol, or hexanediol; a (poly)oxy$C_{2-4}$alkylene glycol; an asymmetrical aromatic dicarboxylic acid such as phthalic acid or isophthalic acid, or an acid anhydride thereof; and a $C_{6-12}$aliphatic dicarboxylic acid such as adipic acid. Moreover, a branched structure may be introduced into a linear polyester by using or modifying with small amounts of a polyol and/or a polycarboxylic acid.

In the case where the aromatic polyester-series resin does not have a predetermined concentration of the active atom(s), a modified polyester-series resin modified with a modifying compound having the active atom(s) (e.g., an aromatic polyester-series resin having at least one member selected from an amino group and an oxyalkylene group) may be used. As the compound having the active atom(s), in particular, an active hydrogen atom, there may be mentioned, for example, a polyamine [e.g., an aliphatic diamine such as a linear- or branched-alkylenediamine having about 2 to 10 carbon atoms, e.g., ethylenediamine, trimethylenediamine, propylenediamine, tetramethylenediamine, pentamethylenediamine, hexamethylenediamine, trimethylhexamethylenediamine, 1,7-diaminoheptane, or 1,8-diaminooctane; an alicyclic diamine such as isophorone diamine, bis(4-amino-3-methylcyclohexyl)methane, or bis(aminomethyl)cyclohexane; and an aromatic diamine such as phenylenediamine, xylylenediamine, or diaminodiphenylmethane]; and a polyol [e.g., a $C_{2-6}$ alkylene glycol such as ethylene glycol, propylene glycol, butanediol, or hexanediol, a (poly)oxy$C_{2-4}$alkylene glycol such as a (poly)oxyethylene glycol, a (poly)oxytrimethylene glycol, a (poly)oxypropylene glycol, or a (poly) oxytetramethylene glycol]. The modification may be conducted by, for example, heating a mixture of a polyester-series resin and the modifying compound to cause an amidation, an esterification or a transesterification reaction. The degree of the modification of the polyester-series resin may depend on an amount of the active hydrogen atom(s) in the compound, and may for example be about 0.1 to 2 mol, preferably about 0.2 to 1.5 mol, and more preferably about 0.3 to 1 mol of the modifying compound relative to 1 mol of a functional group (a hydroxyl group or a carboxyl group) of the polyester-series resin. In the transesterification reaction, the amount of the polyol may be about 1 to 50 parts by weight, and preferably about 5 to 30 parts by weight relative to 100 parts by weight of the polyester-series resin.

In the polyester-series resin, the active hydrogen atom usually comprises a hydrogen atom of a methylene group of a (poly)oxyalkylene unit. In the modified polyester-series resin, an active hydrogen atom usually comprises a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), and in particular the hydrogen atom of the terminal amino group.

Moreover, in the polyester-series resin, in the case introducing an unsaturated bond as the resin (i), for example, a residual carboxyl group or a residual hydroxyl group may be utilized as the reactive group (B), and in the case introducing the unsaturated bond as the resin (ii), the unsaturated polycarboxylic acid such as maleic acid or the unsaturated polyhydric alcohol such as 2-buten-1,4-diol may be utilized as part of the copolymerizable component.

(3) Poly(thio)ether-series Resin

The poly(thio)ether-series resin includes a polyoxyalkylene-series resin, a polyphenylene ether-series resin, and a polysulfide-series resin (polythioether-series resin). As examples of the polyoxyalkylene-series resin, there may be mentioned a polyoxy$C_{2-4}$alkylene glycol such as a polyoxymethylene glycol, a polyoxyethylene glycol, a polyoxypropylene glycol, a polyoxyethylene-polyoxypropylene block-copolymer, a polyoxytetramethylene glycol, and the like. Preferred examples of the poly(thio)ether-series resin include a polyacetal-series resin, a polyphenylene ether-series resin, a polysulfide-series resin, and a polyether ketone-series resin. Incidentally, in the case introducing an unsaturated bond as the resin (i), a residual hydroxyl group, a residual mercapto group and the like may be utilized as the reactive group (B).

(3a) Polyacetal-series Resin

The polyacetal-series resin may be a homopolymer (homopolymer of formaldehyde) comprising a regular repetition of an acetal bond, or a copolymer (e.g., a copolymer of trioxane with ethylene oxide and/or 1,3-dioxolane) obtained by ring-opening polymerization or others. Moreover, the end or terminal of the polyacetal-series resin may be blocked or capped to stabilize the resin. In the polyacetal-series resin, an active hydrogen atom comprises, for example, a hydrogen atom of an oxymethylene unit, a hydrogen atom of an alkoxy group (in particular methoxy group) of a blocked terminal, and in particular the hydrogen atom of the oxymethylene unit. Moreover, regarding the polyacetal-series resin, in the case introducing an unsaturated bond as the resin (i), a residual hydroxyl group and the like may be utilized as the reactive group (B).

(3b) Polyphenylene Ether-series Resin

The polyphenylene ether-series resin includes various resins comprising 2,6-dimethylphenylene oxide as a main component, for example, a copolymer of 2,6-dimethylphenylene oxide and a phenol, and a modified polyphenylene ether-series resin obtained by blending or grafting a styrenic resin in the polyphenylene-series resin. As other modified polyphenylene ether-series resins, there may be mentioned a polyphenylene ether/polyamide-series, a polyphenylene ether/saturated polyester-series, a polyphenylene ether/polyphenylene sulfide-series, a polyphenylene ether/polyolefin-series and the like. In the case of blending with a styrenic resin, the proportion of the styrenic resin may for example be about 2 to 150 parts by weight, preferably about 3 to 100 parts by weight, and more preferably about 5 to 50 parts by weight relative to 100 parts by weight of a polyphenylene ether-series resin. In the polyphenylene ether-series resin, for example, the active hydrogen atom comprises a hydrogen atom of a methyl group bonding to a benzene ring.

(3c) Polysulfide-series Resin (Polythioether-series Resin)

The polysulfide-series resin is not particularly restricted to a specific resin so far as the resin has a thio group (—S—) in the polymer chain. Such a resin includes, for example, a polyphenylene sulfide resin, a polydisulfide resin, a polybiphenylene sulfide resin, a polyketone sulfide resin, a polythioether sulfone resin, and the like. Moreover, the polysulfide-series resin may have a substituent such as an amino group, like a poly(aminophenylene sulfide). The preferred polysulfide-series resin is a polyphenylene sulfide resin. In the polysulfide-series resin, the active sulfur atom comprises a sulfur atom of a thio group in the main chain.

(3d) Polyether Ketone-series Resin

The polyether ketone-series resin includes, for example, a polyether ketone-series resin obtained by a polycondensation between a dihalogenobenzophenone (e.g., dichlorobenzophenone) and a dihydrobenzophenone, a polyether-ether ketone resin obtained by a polycondensation between a dihalogenobenzophenone and a hydroquinone.

(4) Polycarbonate-series Resin

As the polycarbonate-series resin, an aliphatic polycarbonate-series resin may be used, and there may be usually employed an aromatic polycarbonate-series resin [for example, an aromatic polycarbonate obtained from a reaction between an aromatic dihydroxy compound (e.g., a bisphenol compound such as bisphenol A, bisphenol F, bisphenol AD or bisphenol S) and a phosgene or a diester carbonate (e.g., a diaryl carbonate such as a diphenyl carbonate, a dialkyl carbonate such as a dimethyl carbonate)]. In the case introducing an unsaturated bond as the resin (i), in the polycarbonate-series resin, a residual hydroxyl group and the like may be utilized as the reactive group (B).

(5) Polyimide-series Resin

The polyimide-series resin includes a thermoplastic polyimide-series resin, for example, a polyimide resin obtained by a reaction between an aromatic tetracarboxylic acid or an anhydride thereof (e.g., benzophenone tetracarboxylic acid) and an aromatic diamine (e.g., diaminodiphenylmethane), a polyamide imide resin, a polyester imide resin, or the like. In the case introducing an unsaturated bond as the resin (i), in the polyimide-series resin, a residual carboxyl group or acid anhydride group, a residual amino group, a residual imino group and the like may be utilized as the reactive group (B).

(6) Polysulfone-series Resin

The polysulfone-series resin includes a polysulfone resin obtained by a polycondensation of a dihalogenodiphenyl sulfone (e.g., dichlorodiphenyl sulfone) and a bisphenol (e.g., bisphenol A or a metal salt thereof), a polyether sulfone resin, a polyallyl sulfone resin (e.g., bland name "RADEL"), or the like.

(7) Polyurethane-series Resin

The polyurethane-series resin can be obtained by reacting a diisocyanate, a polyol (in particular, a diol) and, if necessary, a chain-extension agent. As the diisocyanate, there are exemplified an aliphatic diisocyanate such as hexamethylene diisocyanate or 2,2,4-trimethylhexamethylene diisocyanate; an alicyclic diisocyanate such as 1,4-cyclohexane diisocyanate or isophorone diisocyanate; an aromatic diisocyanate such as phenylene diisocyanate, tolylene diisocyanate, or diphenylmethane-4,4'-diisocyanate; an araliphatic diisocyanate such as xylylene diisocyanate; and so on. As the diisocyanate, there may be utilized a compound in which an alkyl group (e.g., methyl group) is substituted on a main chain or a ring thereof.

As the diol, there may be utilized a polyester diol (e.g., a polyesterdiol derived from a $C_{4-12}$aliphatic dicarboxylic acid component such as adipic acid; a $C_{2-12}$aliphatic diol component such as ethylene glycol, propylene glycol, butanediol, or neopentyl glycol; a $C_{4-12}$lactone component such as ε-caprolactone), a polyether diol (e.g., a polyethylene glycol, a polypropylene glycol, a polyoxyethylene-polyoxypropylene block-copolymer, a polyoxytetramethylene glycol, a bisphenol A-alkylene oxide adduct), a polyester ether diol (a polyester diol in which the polyether diol is used as a part of the diol component).

Furthermore, as the chain-extension agent, a $C_{2-10}$alkylene glycol such as ethylene glycol or propylene glycol as well as a diamine may be used. The diamine includes, for example, an aliphatic diamine such as a linear- or branched-alkylenediamine having about 2 to 10 carbon atoms (e.g., ethylenediamine, trimethylenediamine, tetramethylenediamine, pentamethylenediamine, hexamethylenediamine, trimethylhexamethylenediamine, 1,7-diaminoheptane, 1,8-diaminooctane) and a linear- or branched-polyalkylenepolyamine (e.g., diethylenetriamine, triethylenetetramine, tetraethylenepentamine, dipropylenetriamine); an alicyclic diamine such as isophoronediamine, bis(4-amino-3-methylcyclohexyl)methane, or bis(aminomethyl)cyclohexane; and an aromatic diamine such as phenylenediamine, xylylenediamine, or diaminodiphenylmethane.

In the polyurethane-series resin, an active hydrogen atom comprises, for example, a hydrogen atom of an alkyl group bonding to a main chain or a ring of a diisocyanate (in particular a hydrogen atom at a benzyl position), a hydrogen atom in an alkylene group of a polyol or a polyoxyalkylene glycol, a hydrogen atom in an amino group of the chain-extension agent.

Moreover, in the polyurethane-series resin, in the case introducing an unsaturated bond as the resin (i), for example, a residual hydroxyl group, a residual amino group, a residual isocyanate group and the like may be utilized as the reactive group (B), and in the case introducing an unsaturated bond as the resin (ii), the unsaturated polycarboxylic acid such as maleic acid or the unsaturated polyhydric alcohol such as 2-buten-1,4-diol may be utilized as part of the copolymerizable component.

(8) Polyolefinic Resin

The polyolefinic resin includes, for example, a homopolymer or copolymer of an olefin such as a polyethylene, a polypropylene, an ethylene-propylene copolymer or a poly (methylpentene-1); and a copolymer of an olefin and a copolymerizable monomer (e.g., an ethylene-vinyl acetate copolymer, an ethylene-(meth)acrylic acid copolymer, an ethylene-(meth)acrylate copolymer). These polyolefinic resins may be used singly or in combination.

The preferred polyolefinic resin includes a polypropylene-series resin having a propylene content of not less than 50% by weight (in particular, 75 to 100% by weight), for example, a polypropylene, a propylene-ethylene copolymer, a propylene-butene copolymer, a propylene-ethylene-butene copolymer, and soon. Moreover, the polyolefinic resin preferably has crystallinity.

In the polyolefinic resin, for example, an active hydrogen atom comprises a hydrogen atom of a methylene group constituting a main chain of the polyolefin, a hydrogen atom of a methyl group branched from the main chain.

(9) Halogen-containing Resin

As the halogen-containing resin, there are mentioned, for example, a chlorine-containing vinyl-series resin such as a polyvinyl chloride, a polyvinylidene chloride, a copolymer of vinyl chloride and vinyl acetate, or a copolymer of vinylidene chloride and vinyl acetate; a fluorine-containing vinyl-series resin such as a polyvinyl fluoride, a polyvinylidene fluoride, a polychlorotrifluoroethylene, or a copolymer of tetrafluoroethylene and a copolymerizable monomer. The preferred halogen-containing resin is the fluorine-containing vinyl-series resin (e.g., the polyvinyl fluoride and the polyvinylidene fluoride).

(10) Styrenic Resin

As the styrenic resin, there are exemplified a homopolymer or copolymer of a styrenic monomer (e.g., a polystyrene, a styrene-vinyl toluene copolymer, a styrene-α-methylstyrene copolymer), a copolymer of a styrenic monomer and a copolymerizable monomer [e.g., a styrene copolymer such as a styrene-acrylonitrile copolymer (AS resin), a (meth)acrylate-styrene copolymer (e.g., MS resin), a styrene-maleic anhydride copolymer or a styrene-butadiene copolymer; a styrenic graft copolymer such as a high-impact polystyrene (HIPS), an acrylonitrile-butadiene-styrene copolymer (ABS resin), an acrylonitrile-acrylic rubber-styrene copolymer (an acrylonitrile-acrylate-styrene copolymer) (AAS resin), an acrylonitrile-chlorinated polyethylene-styrene copolymer (ACS resin), an acrylonitrile-ethylene propylene rubber-styrene copolymer (AES resin), or an acrylonitrile-(ethylene-vinyl acetate copolymer)-styrene copolymer (an acrylonitrile-vinyl acetate-styrene copolymer) (AXS resin)].

(11) (Meth)acrylic Resin

The (meth)acrylic resin includes a homopolymer or copolymer of a (meth)acrylic monomer, a copolymer of a (meth)acrylic monomer and a copolymerizable monomer, and so on. The (meth)acrylic monomer may include, for example, (meth)acrylic acid, a $C_{1-10}$alkyl(meth)acrylate such as methyl(meth)acrylate, ethyl(meth)acrylate, isopropyl (meth)acrylate, butyl(meth)acrylate, or 2-ethylhexyl(meth)acrylate; a $C_{5-10}$cycloalkyl(meth)acrylate such as cyclohexyl (meth)acrylate; a $C_{6-10}$aryl(meth)acrylate such as phenyl (meth)acrylate; a hydroxy$C_{2-10}$alkyl(meth)acrylate such as hydroxyethyl(meth)acrylate; a (meth)acrylamide; a (meth) acrylonitrile; and a glycidyl(meth)acrylate. The copolymerizable monomer includes a vinyl-series monomer such as vinyl acetate or vinyl chloride, a styrenic monomer such as styrene or α-methylstyrene, and the like.

In the (meth)acrylic resin, in the case introducing an unsaturated bond as the resin (i), the reactive group (B) can be introduced by utilizing a monomer having the reactive group (B) as a copolymerizable component.

(12) Thermoplastic Elastomer

The thermoplastic elastomer includes, for example, a polyamide-series elastomer (a copolymer comprising a polyamide as a hard segment and an aliphatic polyether as a soft segment), a polyester-series elastomer (a copolymer comprising a polyalkylene arylate as a hard segment and an aliphatic polyether or aliphatic polyester as a soft segment), a polyurethane-series elastomer (a copolymer comprising a polyurethane containing a short-chain glycol as a hard segment and an aliphatic polyether or aliphatic polyester as a soft segment, for example, a polyester-urethane elastomer, a polyether-urethane elastomer, or the like), a polystyrenic elastomer (a block copolymer comprising a polystyrenic block as a hard segment and a diene-polymer block or a hydrogenated block thereof as a soft segment), a polyolefinic elastomer (e.g., an elastomer comprising a polyethylene or polypropylene as a hard segment and an ethylene-propylene rubber or an ethylene-propylene-diene rubber as a soft segment; an olefinic elastomer comprising a hard segment and a soft segment which are different in crystallinity), a polyvinyl chloride-series elastomer, a fluorine-containing thermoplastic elastomer, and so on. As the aliphatic polyether, there may be used a (poly) oxy$C_{2-4}$alkylene glycol (in particular a (poly) oxyethylene glycol) exemplified in the paragraphs of the polyester-series resin and the polyurethane-series resin. As the aliphatic polyester, for example, the polyesterdiol mentioned in the paragraph of the polyurethane-series resin may be used. These thermoplastic elastomers may be used singly or in combination.

When the thermoplastic elastomer is a block copolymer, the block structure is not particularly restricted, and may be a triblock structure, a multiblock structure, a star-shaped block structure or other structure.

The preferred examples of the thermoplastic elastomer include a polyamide-series elastomer, a polyester-series elastomer, a polyurethane-series elastomer, a polystyrenic elastomer, and a polyolefinic elastomer.

In the thermoplastic elastomer, an active hydrogen atom may comprise, for example, a hydrogen atom of an oxyalkylene unit constituting a soft segment.

Moreover, a vinyl polymerizable resin [e.g., a (meth) acrylic resin (a polymethyl methacrylate, a methyl methacrylate-styrene copolymer, etc.) and a styrenic resin (a polystyrene; a styrene copolymer such as AS resin; a styrene-series graft copolymer such as HIPS and ABS resin)] may be crosslinked by copolymerization of a multifunctional polymerizable compound having two or more functional groups (e.g., ethylene glycol di(meth)acrylate, diethylene glycol di(meth)acrylate, dipropylene glycol di(meth)acrylate, trimethylolpropane tri(meth)acrylate, etc.) and a constitutive monomer.

[Rubber]

The vulcanized rubber constituting the dispersed phase is obtained by vulcanizing an unvulcanizing rubber. The rubber is not particularly limited, and various rubbers may be used.

The rubber may include a diene-series rubber, an olefinic rubber, an acrylic rubber, a fluorine-containing rubber, a silicone-series rubber (a silicone rubber), a urethane-series rubber, an epichlorohydrin rubber (e.g., a homopolymer of epichlorohydrin (CO), a copolymer of epichlorohydrin and ethylene oxide (ECO), a copolymer further copolymerized with allyl glycidyl ether), a chlorosulfonated polyethylene, a propylene oxide rubber (GPO), an ethylene-vinyl acetate copolymer (EAM), a polynorbornene rubber, and a modified rubber thereof (e.g., an acid-introduced (or acid-modified) rubber), and other rubbers. These rubbers may be used singly or in combination. Among these rubbers, in view of a practical use, a widely employed rubber usually includes the diene-series rubber, the olefinic rubber, the acrylic rubber, the fluorine-containing rubber, the silicone-series rubber, the urethane-series rubber, and so on.

As the diene-series rubber, for example, there may, be mentioned a natural rubber (NR); a polymer of a diene-series monomer, such as an isoprene rubber (IR), an isobutylene-isoprene rubber (butyl rubber) (IIR), a butadiene rubber (BR), or a chloroprene rubber (CR); an acrylonitrile-diene copolymerized rubber such as an acrylonitrile-butadiene rubber (nitrile rubber) (NBR), a nitrile-chloroprene rubber (NCR), a nitrile-isoprene rubber (NIR), or an acrylonitrile-isoprene-butadiene rubber (NBIR); a styrene-diene copolymerized rubber such as a styrene-butadiene rubber (SBR, for example, a random copolymer of styrene and butadiene, a SB-block copolymer comprising a styrene block and a butadiene block), a styrene-chloroprene rubber (SCR), or a styrene-isoprene rubber (SIR); and other diene-containing rubber. The diene-series rubber also includes a hydrogenated rubber, for example, a hydrogenated nitrile rubber (HNBR) or the like. Incidentally, the proportion of a styrenic component in a styrene-diene copolymerized rubber, for example, may be about 10 to 80 mol %, preferably about 20 to 70 mol % and more preferably about 30 to 60 mol % in terms of a monomer constituting the copolymer.

The olefinic rubber includes, for example, an ethylene-propylene rubber (EPM), an ethylene-propylene-diene rubber (EPDM), and other rubbers.

The acrylic rubber includes a rubber comprising an alkyl acrylate as a main component, such as a copolymer of an alkyl acrylate and a chlorine-containing crosslinkable monomer (ACM), a copolymer of an alkyl acrylate and acrylonitrile (ANM), a copolymer of an alkyl acrylate and a carboxyl group- and/or epoxy group-containing monomer, and an ethylene-acrylic rubber.

As the fluorine-containing rubber, there are exemplified a rubber obtained by using a fluorine-containing monomer, for example, a copolymer of vinylidene fluoride and perfluoropropene, and if necessary, tetrafluoroethylene (FKM); a copolymer of tetrafluoroethylene and propylene; a copolymer of tetrafluoroethylene and perfluoromethyl vinyl ether (FFKM).

A silicone-series rubber (Q) means an organopolysiloxane comprising a unit represented by a formula $R_aSiO_{(4-a)/2}$. In the formula, R represents, for example, a $C_{1-10}$alkyl group such as methyl, ethyl, propyl or butyl group; a halogenated $C_{1-10}$alkyl group such as 3-chloropropyl group or 3,3,3-trifluoropropyl group; a $C_{2-10}$alkenyl group such as vinyl, allyl or butenyl group; a $C_{6-12}$aryl group such as phenyl, tolyl or naphthyl group; a $C_{3-10}$cycloalkyl group such as cyclopentyl or cyclohexyl group; a $C_{6-12}$aryl-$C_{1-4}$alkyl group such as benzyl or phenethyl group. The coefficient "a" is about 1.9 to 2.1 in the formula. The preferred R is methyl group, phenyl group, an alkenyl group (e.g., vinyl group), and a fluoro$C_{1-6}$ alkyl group.

A molecular structure of the silicone-series rubber is usually a linear structure. The molecular structure may have a branched structure partially, and may be branched. A main chain of the silicone rubber can comprise for example, a poly(dimethylsiloxane) chain, a poly(methylvinylsiloxane) chain, a poly(methylphenyl siloxane) chain, a copolymer chain of the above mentioned siloxane unit [e.g., a dimethylsiloxane-methylvinylsiloxane copolymer chain, a dimethylsiloxane-methylphenylsiloxane copolymer chain, a dimethylsiloxane-methyl(3,3,3-trifluoropropyl)siloxane copolymer chain, a dimethylsiloxane-methylvinylsiloxane-methylphenylsiloxane copolymer chain]. Both terminals of the silicone rubber may for example be trimethylsilyl group, dimethylvinylsilyl group, silanol group, a tri$C_{1-2}$alkoxysilyl group and the like.

The silicone-series rubber (Q) includes, for example, a methylsilicone rubber (MQ), a vinylsilicone rubber (VMQ), a phenylsilicone rubber (PMQ), a phenylvinylsilicone rubber (PVMQ), a fluorosilicone rubber (FVMQ), and the like. Further, such a silicone-series rubber includes not only a solid rubber of the High Temperature Vulcanizable (HTV) silicone rubber but also a Room Temperature Vulcanizable (RTV) silicone rubber or Low Temperature Vulcanizable (LTV) silicone rubber, for example a liquid or paste-like rubber.

In the case where the silicone rubber has an unsaturated bond, the number of the unsaturated bond of the silicone rubber constituting the unvulcanized silicone rubber may be not less than 2 (e.g., about 2 to 10) per molecule on the average, preferably about 2.5 to 7, and more preferably about 2.5 to 5 (e.g., about 2.5 to 4).

As the polyorganosiloxane in the silicone rubber or the composition thereof, there are used a polyorganosiloxane having a double bond concentration of about 2 to 540 mmol/kg, preferably about 3 to 300 mmol/kg, and more preferably about 4 to 100 mmol/kg. The polyorganosiloxane may comprise a single kind of polyorganosiloxane, and may be a mixture of plural kinds of polyorganosiloxanes (e.g., a mixture of plural polymers different in polymerization degree).

In the case of using a plurality of polyorganosiloxanes, the double bond concentration can be calculated from each double bond concentration of the plural polyorganosiloxanes constituting the mixture and a composition ratio of the plural polyorganosiloxanes constituting the mixture, etc. An average polymerization degree of the polyorganosiloxane can be selected suitably. In the case of a polyorganosiloxane having a low polymerization degree, the average polymerization degree may for example be about 3 to 500, and preferably about 3 to 200, and in the case of a polyorganosiloxane having a high polymerization degree, the average polymerization degree may for example be about 500 to 12000, and preferably about 1000 to 7000. When a plurality of polyorganosiloxanes different in the polymerization degree are used, a proportion of a polyorganosiloxane of low polymerization degree to a polyorganosiloxane of high polymerization degree depends on properties of a cured silicone rubber obtained by vulcanization, and the former/the latter (weight ratio) is about 1/99 to 50/50, preferably about 1/99 to 10/90, and more preferably about 2/98 to 7/93.

Further, a silicone rubber composition often comprises a polyorganohydrogensiloxane having a hydrogen atom directly bonded to a silicon atom of not less than 2 on the average per molecule. An added amount of the polyorganohydrogensiloxane is not more than 4 parts by weight (e.g., 0.1 to 4 parts by weight), preferably not more than 3 parts by weight, and more preferably not more than 2 parts by weight, relative to 100 parts by weight of the polyorganosiloxane as a main component.

The urethane rubber (U) includes, for example, a polyester-based urethane elastomer, a polyether-based urethane elastomer, and others.

As the modified rubber, there may be mentioned, for example, an acid-introduced (or acid-modified) rubber such as a carboxyl group- or acid anhydride group-containing rubber [e.g., a carboxylic styrene-butadiene rubber (X-SBR), a carboxylic nitrile rubber (X-NBR), a carboxylic ethylene-propylene rubber (X-EP(D)M).

Incidentally, the rubber component may be used in the form of particulate. The form (or shape) of the rubber particulate is not particularly limited, and may for example be an amorphous, a spherical, a elliptical, or a rod-like form (or shape). The mean particle size of the rubber particulate is, for example, about 0.1 to 800 μm, preferably about 0.5 to 500 μm, and more preferably about 0.8 to 300 μm.

The proportion of the continuous phase (or resin) relative to the dispersed phase (or unvulcanized rubber or vulcanized rubber) may be suitably set so that properties of the composite dispersion can be effectively expressed. For example, the continuous phase/the dispersed phase (weight ratio) may be about 25/75 to 98/2, preferably about 30/70 to 90/10, and more preferably about 40/60 to 80/20 (e.g., about 40/60 to 65/35).

[Vulcanizing Agent]

The vulcanizing agent not only vulcanizes (or crosslinks) an unvulcanized rubber, but also activates a resin (for example, activates a crosslinkable group of the crosslinkable resin, or activates the resin radically by a hydrogen-drawing reaction in which the active hydrogen atom is drawn from the resin) to improve adhesiveness between the resin and the rubber, and the resin phase can be bonded to the rubber phase. As the vulcanizing agent, a radical-generating agent or sulfur may be used depending on the species of the resin or the rubber. As the radical-generating agent, there may be exemplified an organic peroxide, an azo compound, a sulfur-containing organic compound, and the like. Incidentally, in the present invention, the sulfur is effective in the resin having an unsaturated bond (or bonds), the polyphenylene ether-series resin, the polysulfide-series resin, or the like in many cases. The vulcanizing agent(s) may be used singly or in combination.

The vulcanizing agent may be added to at least one component selected from the unvulcanized rubber and the resin, e.g., to both components.

The organic peroxide includes, for example, a diacyl peroxide (e.g., lauroyl peroxide, benzoyl peroxide, 4-chlorobenzoyl peroxide, 2,4-dichlorobenzoyl peroxide), a dialkyl peroxide [e.g., di-t-butyl peroxide, 2,5-di(t-butylperoxy)-2,5-dimethylhexane, 1,1-bis(t-butylperoxy)-3,3,5-trimethylcyclohexane, 2,5-di(t-butylperoxy)-2,5-dimethylhexene-3,1,3-bis(t-butylperoxyisopropyl)benzene, dicumyl peroxide], an alkyl peroxide (e.g., t-butyl hydroperoxide, cumene hydroperoxide, 2,5-dimethylhexane-2,5-dihydroperoxide, diisopropylbenzene hydroperoxide), an alkylidene peroxide [e.g., ethylmethylketone peroxide, cyclohexanone peroxide, 1,1-bis(t-butylperoxy)-3,3,5-trimethylcyclohexane], a peracid ester (e.g., t-butyl peracetate, t-butyl perpivalate).

The azo compound includes azobisisobutylonitrile and other compounds. The sulfur-containing organic compound includes, for example, a thiuram [e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), morpholinedisulfide, an alkylphenoldisulfide].

Such a sulfur includes a powdered sulfur, a precipitated sulfur, a colloidal sulfur, an insoluble sulfur, a highly dispersant sulfur and so on. Moreover, the sulfur also includes a sulfur chloride such as sulfur monochloride or sulfur dichloride.

As the radical-generating agent, a photopolymerization initiator also may be employed as far as a photoirradiation can be applied to an adhesion between the resin phase and the rubber phase. The photopolymerization initiator or photoinitiator may include, for example, a benzophenone or a derivative thereof (e.g., 3,3'-dimethyl-4-methoxybenzophenone, 4,4-dimethoxybenzophenone), an alkylphenylketone or a derivative thereof [e.g., acetophenone, diethoxyacetophenone, 2-hydroxy-2-methyl-1-phenylpropan-1-on, benzyldimethylketal, 1-hydroxycyclohexylphenylketone, 2-benzyl-2-dimethylamino-1-(morpholinophenyl)-butanone], an anthraquinone or a derivative thereof (e.g., 2-methyl anthraquinone), a thioxanthone or a derivative thereof (e.g., 2-chlorothioxanthone, an alkylthioxanthone), a benzoin ether or a derivative thereof (e.g., benzoin, a benzoin alkyl ether), a phosphine oxide or a derivative thereof, and others. Further, the radical-generating agent also includes a persulfate (e.g., ammonium persulfate, potassium persulfate).

Among these compounds, the preferred vulcanizing agent is the organic peroxide. The vulcanizing agent is preferably comprised in at least the unvulcanized rubber, and is usually comprised in the unvulcanized rubber in many cases.

The proportion of the vulcanizing agent can be selected within a range of, for example, about 0.1 to 15 parts by weight relative to 100 parts by weight of an unvulcanized rubber and/or a resin, and is usually about 0.1 to 10 parts by weight, and preferably about 0.1 to 8 parts by weight (e.g., about 1 to 7 parts by weight) relative to 100 parts by weight of an unvulcanized rubber and/or a resin.

[Vulcanization-activating Agent]

The vulcanization-activating agent can improve wettability of the resin and the rubber to uniformly bond to each other, and depending on the variety, the vulcanization-activating agent can crosslink the resin with the rubber following vulcanization (or crosslinking) of an unvulcanized rubber with a vulcanizing agent (e.g., a radical-generating agent) to improve the crosslinking density of the resin and the rubber, thereby bonding or adhering the resin to the rubber firmly.

The vulcanization-activating agent may be added to any one of the resin (or resin composition) and the unvulcanized rubber (or unvulcanized rubber composition), or may be added to the both components.

The vulcanization-activating agent includes a compound containing an unsaturated bond (e.g., a carbon-carbon double bond, a carbon-nitrogen double bond, a carbon-oxygen double bond, and a carbon-sulfur double bond) in the molecule. The unsaturated bond-containing compound may be selected depending on a vulcanizing agent to be used (e.g., a radical-generating agent), and includes an organic compound having a polymerizable unsaturated bond [for example, a vinyl-series monomer (e.g., divinylbenzene), an allyl-series monomer (e.g., diallyl phthalate, triallyl phosphate, triallyl (iso)cyanurate), a (meth)acrylic monomer], a maleimide compound, and others. The vulcanization-activating agent(s) (or activator(s)) may be used singly or in combination.

Examples of the (meth)acrylic monomer include a bifunctional (meth)acrylate [e.g., a $C_{2-10}$alkylene glycol di(meth)acrylate such as ethylene glycol di(meth)acrylate, propylene glycol di(meth)acrylate, 1,4-butanediol di(meth)acrylate, hexanediol di(meth)acrylate, or neopentyl glycol di(meth)acrylate; a poly$C_{2-4}$alkylene glycol di(meth)acrylate such as diethylene glycol di(meth)acrylate, triethylene glycol di(meth)acrylate, a polyethylene glycol di(meth)acrylate, dipropylene glycol di(meth)acrylate, tripropylene glycol di(meth)acrylate, a polypropylene glycol di(meth)acrylate, or a polytetramethylene glycol di(meth)acrylate; glycerol di(meth)acrylate; trimethylolpropane di(meth)acrylate; pentaerythritol di(meth)acrylate; and di(meth) acrylate of bisphenol A-$C_{2-4}$alkylene oxide-adduct], a tri- or poly-functional (multifunctional) (meth)acrylate [e.g., glycerol tri(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol hexa (meth)acrylate].

The maleimide-series compound includes a maleimide compound having a plurality of maleimide groups, and may be obtained by a reaction of a polyamine with a maleic anhydride. Examples of the maleimide-series compound include an aromatic bismaleimide [e.g., N,N'-1,3-phenylenedimaleimide, N,N'-1,4-phenylenedimaleimide, N,N'-(3-methyl-1,4-phenylene)dimaleimide, 4,4'-bis(N,N'-maleimide)diphenylmethane, 4,4'-bis(N,N'-maleimide)diphenyl sulfone, 4,4'-bis(N,N'-maleimide)diphenyl ether], an aliphatic bismaleimide (e.g., N,N'-1,2-ethylenebismaleimide, N,N'-1,3-propylenebismaleimide, N,N'-1,4-tetramethylenebismaleimide), etc.

The preferred vulcanization-activating agent includes a compound having a plurality (e.g., about 2 to 6, in particular about 3 to 6) of carbon-carbon double bonds (polymerizable unsaturated bond) per molecule, for example, a triallyl (iso)cyanurate, a di- to polyfunctional (multifunctional) (meth)acrylate (in particular, tri- or poly-functional (multifunctional) (meth)acrylate), and an aromatic maleimide compound (e.g., a bismaleimide).

The amount of the vulcanization-activating agent may for example be selected from the range of about 0.1 to 10 parts by weight, preferably about 0.1 to 5 parts by weight, and more preferably about 0.1 to 3 parts by weight relative to 100 parts by weight of the resin and/or unvulcanized rubber.

Moreover, in the case where the unvulcanized rubber contains the vulcanizing agent and the vulcanization-activating agent, the ratio (weight ratio) of the vulcanizing agent relative to the vulcanization-activating agent [the former/the latter] may be about 2/98 to 70/30, preferably about 10/90 to 60/40

(e.g., about 20/80 to 55/45), and more preferably about 30/70 to 50/50. The use of the vulcanization-activating agent in such a ratio insures effective activation of the unvulcanized rubber to the vulcanizing agent, thereby firmly adhering the resin to the rubber in many cases.

[Polyalkenylene]

The polyalkenylene increases flowability of the rubber component (or resin component) so that the polyalkenylene can improve dispersibility of the rubber (or resin) relative to the resin (or unvulcanized rubber) and can enhance adhesiveness between the resin phase and the rubber phase. Moreover, addition of the polyalkenylene (in particular addition to the rubber component) ensures improvement in mold-releasing property upon the production process of the composite dispersion,. The polyalkenylene may be added to any one component of the resin and the unvulcanized rubber, or added to the both components.

The polyalkenylene includes a $polyC_{4-15}$alkenylene such as a polybutadiene, a polyisoprene, a polypentenamer, a polyheptenamer, a polyoctenamer (a polyoctenylene), a poly(3-methyloctenamer), a polydecenamer, a poly(3-methyldecenamer), or a polydodecenamer, and others. Incidentally, the $polyC_{4-15}$alkenylene may be obtained by a metathesis polymerization of a cycloolefin (for example, a $C_{5-20}$cycloolefin which may have a substituent, e.g., cyclopentene, cycloheptene, cyclooctene, cyclodecene, or cyclododecene), a partial hydrogenation of a polyalkenylene (e.g., a polybutadiene), or others. The polyalkenylene may be used singly or in combination.

The proportion of the polyalkenylene to be added may for example be about 0.5 to 40 parts by weight, preferably about 1 to 30 parts by weight, and more preferably about 2 to 20 parts by weight relative to 100 parts by weight of the resin or unvulcanized rubber.

Moreover, in the case where the unvulcanized rubber contains the vulcanizing agent and the polyalkenylene, the ratio (weight ratio) of the vulcanizing agent relative to the polyalkenylene [the former/the latter] may be about 2/98 to 45/55, preferably about 2/98 to 40/60, and more preferably about 2/98 to 35/65 (e.g., about 5/95 to 35/65). The addition of the vulcanizing agent and the polyalkenylene at such a ratio efficiently improves adhesiveness of the rubber to the resin in many cases.

Further, in the case where the unvulcanized rubber contains the vulcanizing agent and the resin (e.g., a polyphenylene ether resin) contains the polyalkenylene, the ratio (weight ratio) of the vulcanizing agent relative to the polyalkenylene [the former/the latter] may be about 2/98 to 50/50, preferably about 3/97 to 40/60, and more preferably about 5/95 to 30/70 (e.g., about 5/95 to 20/80).

[Vulcanization Auxiliary]

In the present invention, a vulcanization auxiliary may be further used. The vulcanization auxiliary may be added to at least one component of the unvulcanized rubber (or unvulcanized rubber composition) and the resin (or resin composition), e.g., to the both components.

The vulcanization auxiliary may be selected depending on the species of the resin and the rubber, and includes, for example, an oligomer of the condensation-series thermoplastic resin [e.g., an oligomer having a number-average molecular weight of not more than 1000 (e.g., about 100 to 1000)], a polyamine [e.g., the polyamine described in the paragraph of the above-mentioned (2) polyester-series resin], a polyol [e.g., the polyol described in the paragraph of the above-mentioned (2) polyester-series resin], a compound having a carboxyl group, acid anhydride group, or isocyanate group of not less than 1 per molecule [e.g., a mono- or polycarboxylic acid such as a dicarboxylic acid (e.g., an aliphatic or aromatic dicarboxylic anhydride described in the paragraph of the polyamide-series resin or the polyester-series resin, an unsaturated dicarboxylic acid described in the paragraph of the above-mentioned resin (ii)), a polycarboxylic anhydride such as a dicarboxylic anhydride (an aliphatic or aromatic dicarboxylic acid such as maleic anhydride, or phthalic anhydride), a (poly)isocyanate compound such as a diisocyanate (a diisocyanate compound described in the paragraph of the polyurethane-series resin)], a compound having a plurality of aldehyde groups, an epoxy compound, a nitrogen-containing compound (e.g., an amino resin), a compound having a methylol group or an alkoxymethyl group, or others. The vulcanization auxiliary (or auxiliaries) may be used singly or in combination.

The preferred vulcanization auxiliary includes a compound having a molecular weight of not more than 1000 and having not less than two of active hydrogen atoms on the average per molecule, among active atoms represented by the formula (1), for example, the oligomer having a number-average molecular weight of not more than 1000 of the condensation-series thermoplastic resin (e.g., an oligomer of the polyamide-series resin, an oligomer of the polyester-series resin), a compound having a carboxyl group, acid anhydride group, or isocyanate group of not less than 1 per molecule, the above-mentioned polyamine, and others.

The amount of the vulcanization auxiliary is, for example, about 0.1 to 30 parts of weight, preferably about 0.5 to 20 parts of weight, and about 1 to 15 parts of weight, relative to 100 parts of weight of the unvulcanized rubber and/or the resin.

[Silane Coupling Agent]

In the present invention, to improve adhesiveness between the resin phase and the vulcanized rubber phase, the composite may comprise a silane coupling agent. The silane coupling agent may be added to any one of the unvulcanized rubber (or unvulcanized rubber composition) and the resin (or resin composition), or may be added to the both components.

The silane coupling agent includes a compound having a reactive group (e.g., a hydroxyl group, an alkoxy group, a vinyl group, an amino group, an epoxy group, a mercapto group, a carboxyl group, an isocyanate group, a (meth)acryloyl group), or others.

Examples of the silane coupling agent includes an alkoxysilane (for example, a $triC_{1-4}$alkoxysilane such as trimethoxysilane or triethoxysilane, a $tetraC_{1-4}$alkoxysilane such as tetramethoxysilane or tetraethoxysilane);

an alkoxysilane having a vinyl group (a $vinyltriC_{1-4}$alkoxysilane such as vinyltrimethoxysilane or vinyltriethoxysilane);

an alkoxysilane having an amino group (for example, an $aminoC_{2-4}alkyltriC_{1-4}$alkoxysilane such as 2-aminoethyltrimethoxysilane, 2-aminoethyltriethoxysilane or 3-aminopropyltriethoxysilane, an $aminodiC_{1-4}alkyldiC_{1-4}$alkoxysilane such as 3-aminopropylmethyldimethoxysilane or 3-aminopropylmethylethoxysilane);

an alkoxysilane having an epoxy group (for example, a $glycidyloxyC_{2-4}alkyltriC_{1-4}$alkoxysilane such as 3-glycidyloxypropyltrimethoxysilane, an (epoxycycloalkyl) $C_{2-4}alkyltriC_{1-4}$alkoxysilane such as 2-(3,4-epoxycyclohexyl)ethyltrimethoxysilane);

an alkoxysilane having a mercapto group (for example, a $mercaptoC_{1-4}alkyltriC_{1-4}$alkoxysilane such as 3-mercaptopropyltrimethoxysilane, a mercaptodiC$_{1-4}$alkyl-diC$_{1-4}$alkoxysilane such as 3-mercaptopropylmethyldimethoxysilane);

an alkoxysilane having a carboxyl group (for example, a carboxyC$_{1-4}$alkyltriC$_{1-4}$alkoxysilane such as carboxymethyltrimethoxysilane, carboxymethyltriethoxysilane, carboxyethyltrimethoxysilane, or carboxypropyltrimethoxysilane);

an alkoxysilane having an isocyanate group (for example, an isocyanatoC$_{1-4}$alkyltriC$_{1-4}$alkoxysilane such as isocyanatoethyltrimethoxysilane, isocyanatoethyltriethoxysilane, or isocyanatopropyltrimethoxysilane);

an alkoxysilane having a (meth)acryloyl group (for example, N-(3-(meth)acryloxy-2-hydroxypropyl)-3-aminopropyltriethoxysilane, 3-(meth)acryloxypropyldimethylmethoxysilane, 3-(meth)acryloxypropyldimethylethoxysilane, or 3-(meth)acryloxypropylmethyldiethoxysilane); and others.

The amount of the silane coupling agent may be usually selected from a range so that the bonding between the resin and the rubber can be accelerated, for example, about 1 to 10 parts by weight, preferably about 2 to 8 parts by weight, and more preferably about 2 to 6 parts by weight relative to 100 parts by weight of the rubber or resin.

[Other Additives]

To the above-mentioned resin (or resin composition) and/or the rubber (or rubber composition) may be added, if necessary, various additives, for example, a filler, a plasticizer or softening agent, a co-vulcanizing agent (e.g., a metal oxide such as zinc oxide), an age resistor (e.g., a heat aging resistant, an antiozonant, an antioxidant, an ultraviolet ray absorber, a heat stabilizer), a tackifier, a lubricant, a colorants (e.g., titanium oxide, carbon black), a foaming agent, a dispersant, a flame retardant, an antistatic agent, and so forth.

The filler (or reinforcer) includes, for example, a powdered or particulate filler or reinforcer (e.g., a mica, a clay, a talc, a silicic acid, a silica, a calcium carbonate, a magnesium carbonate, a carbon black, a ferrite), a fibrous filler or reinforcer (e.g., an organic fiber such as "Rayon", "Nylon", "Vinylon", and "Aramid"; an inorganic fiber such as a carbon fiber or a glass fiber), and other fillers.

The plasticizer is not particularly restricted so far as a plasticity can be imparted to the resin composition or the rubber composition, and includes a conventional plasticizer (e.g., a phthalic acid ester, an aliphatic dicarboxylic acid ester, a polyester-series polymer plasticizer), and others. Moreover, in the rubber composition, a conventional softening agent (e.g., a plant oil such as linolic acid, oleic acid, castor oil, or perm oil; a mineral oil such as a paraffin, a process oil, or an extender) may be used.

The lubricant includes a wax (e.g., a paraffin wax, a microcrystalline wax, a polyethylene wax), a fatty acid (e.g., stearic acid), an aliphatic alcohol (e.g., stearyl alcohol), a fatty acid derivative (e.g., a fatty acid ester such as butyl stearate, a fatty acid amide such as stearic acid amide, a metal salt of a fatty acid such as zinc stearate), and others.

Examples of the foaming agent include an inorganic foaming agent such as a hydrogen carbonate (e.g., sodium hydrogen carbonate, ammonium hydrogen carbonate); an organic foaming agent such as p,p-oxybis(benzenesulfonylhydrazide), or dinitrosopentamethylenetetramine.

The content of the filler may for example be about 0 to 300 parts by weight, preferably about 0 to 200 parts by weight (e.g., about 0 to 100 parts by weight), and more preferably about 0 to 50 parts by weight (e.g., about 0 to 10 parts by weight) relative to 100 parts by weight of the resin or the rubber. The content of the plasticizer or softening agent may for example be about 0 to 200 parts by weight, preferably about 0 to 150 parts by weight, and more preferably about 0 to 120 parts by weight, relative to 100 parts by weight of the resin or the rubber. Moreover, for the co-vulcanizing agent, the age resistor, the processing auxiliary or the lubricant or the colorant, each may be used in a proportion of an effective amount, and the amount of the co-vulcanizing agent may for example be about 0 to 20 parts by weight, preferably about 0.5 to 15 parts by weight, and more preferably about 1 to 10 parts by weight relative to 100 parts by weight of the resin or the rubber.

In the composite dispersion of the present invention, the resin phase and the vulcanized rubber phase constitute the continuous phase and the dispersed phase, respectively. To such a composite can be imparted the vulcanized rubber properties (e.g., antislip property due to friction resistance, adhesiveness to the other material, impact resistance) with the resin properties (e.g., a mechanical property such as rigidity or strong property, a physical property such as heat resistance) kept intact.

The composite dispersion may have an islands-in-an ocean structure in which a dispersed phase is independently dispersed in the continuous phase, and the shape or form of the dispersed phase may be a particulate, an ellipsoidal, a spherical, a bar-like, a fiber-like shape. The dispersed phase is preferably a spherical shape, and is preferably dispersed in the continuous phase uniformly. Incidentally, the mean particle size of the dispersed phase may be, for example, about 0.1 to 1000 μm, preferably about 1 to 750 μm, and more preferably about 10 to 500 μm (e.g., about 50 to 150 μm), as far as properties of the dispersed phase can be expressed. Incidentally, in the case using a crosslinked or cured particle (vulcanized rubber) as a rubber, the mean particle size of the dispersed phase corresponds to the mean particle size of the crosslinked or cured particle.

Further, the dispersed phase particle may be bonded with the surface of the composite dispersion partially exposed. In such a composite dispersion, to a surface thereof can be imparted rubber properties (e.g., high flexibility and buffering property) with the properties of the resin constituting the continuous phase (e.g., low coefficient of friction) held.

Moreover, the obtained composite may comprise the composite dispersion, and may be a composite in which the composite dispersion and other molded article (e.g., a resin molded article, vulcanized rubber molded article) are bonded to each other at the contact surface.

In other embodiment of the present invention, as described above, a composite dispersion comprising a specific combination of a resin and a rubber insures directly firm bonding of a resin phase to a rubber phase. As concrete examples of the above specific combinations, there may be mentioned the following embodiments (2a) to (2d). Incidentally, in these embodiments, the resin may be a resin having the active atom, and the resin and/or the unvulcanized rubber may contain the vulcanization-activating agent or the polyalkenylene.

The embodiment (2a) refers to a combination of a resin, and an unvulcanized rubber containing a vulcanizing agent and a vulcanization-activating agent, wherein the ratio of the vulcanizing agent relative to the vulcanization-activating agent is the same as that described for the vulcanization-activating agent [for example, the vulcanizing agent/the vulcanization-activating agent (weight ratio) is about 2/98 to 70/30, preferably about 10/90 to 60/40 (e.g., 20/80 to 55/45), and more preferably about 30/70 to 50/50].

The composite dispersion of this embodiment (2a) includes a composite dispersion in which the resin comprises a polyamide-series resin and the unvulcanized rubber comprises an unmodified rubber (e.g., a diene-series rubber such as NBR, SBR or HNBR, an olefinic rubber such as EPDM, a fluorine-containing rubber such as FKM). That is, in the present invention, the resin phase and the rubber phase can be adhered to each other by addition of the vulcanization-activating agent at the above-mentioned ratio without utilizing a bonding reaction between an amino group and a carboxyl group.

The embodiment (2b) refers to a combination of a resin (e.g., a polyamide-series resin), and an unvulcanized rubber containing a vulcanizing agent and a polyalkenylene, wherein the ratio of the vulcanizing agent relative to the polyalkenylene is the same as that described for the polyalkenylene [for example, the vulcanizing agent/the polyalkenylene (weight ratio) is about 2/98 to 45/55, preferably about 2/98 to 40/60, and more preferably about 2/98 to 35/65 (e.g., about 5/95 to 35/65)].

The composite dispersion of this embodiment (2b) includes a composite dispersion in which the resin comprises a polyamide-series resin and the unvulcanized rubber comprises an unmodified rubber (e.g., a diene-series rubber such as NBR, SBR or HNBR, an olefinic rubber such as EPDM, a fluorine-containing rubber such as FKM). In this embodiment, the flowability of the unvulcanized rubber can be improved by use of the polyalkenylene at the above-mentioned specific ratio without utilizing a bonding reaction between an amino group and a carboxyl group, whereby the resin phase and the rubber phase can be adhered to each other.

The embodiment (2c) refers to a combination of a resin and a silicone-series unvulcanized rubber.

The composite dispersion of this embodiment (2c) includes, for example, a composite dispersion in which the resin (e.g., a polyamide-series resin) is directly bonded to a silicone-series rubber (for example, VMQ, PVMQ, FVMQ) which may contain a vulcanization-activating agent or a polyalkenylene. That is, use of the silicone-series rubber as a rubber component ensures firm bonding of the resin phase and the rubber phase even in the case of using a resin not containing the vulcanization-activating agent or a crosslinkable group-containing resin, or using the unvulcanized rubber not containing the vulcanization-activating agent or the polyalkenylene at a specific ratio.

The embodiment (2d) refers to a combination of a resin (e.g., a polyphenylene ether-series resin) containing a polyalkenylene, and an unvulcanized rubber containing a sulfur or a sulfur-containing organic compound as a vulcanizing agent.

The composite dispersion of this embodiment (2d) includes a composite dispersion in which the polyphenylene ether-series resin containing a polyalkenylene and the unvulcanized rubber containing a sulfur or a sulfur-containing organic compound as a vulcanizing agent are directly bonded to each other [in particular a composites dispersion in which the ratio of the vulcanizing agent relative to the polyalkenylene is the same as that described for the polyalkenylene (for example, the vulcanizing agent/the polyalkenylene is about 2/98 to 50/50, preferably about 3/97 to 40/60, and more preferably about 5/95 to 30/70 (e.g., about 5/95 to 20/80))]. In such an embodiment, the continuous phase and the dispersed phase can be bonded to each other in general-purpose combinations of the polyphenylene ether-series resin and the rubber even in the case vulcanizing with a non-organic peroxide.

[Process for Producing Composite Dispersion]

In the present invention, a resin is kneaded with a rubber to produce a composite dispersion in which a resin phase (continuous phase) comprising the resin is directly bonded to a rubber phase (dispersed phase) comprising a vulcanized rubber obtained by vulcanizing the unvulcanized rubber.

The rubber used in kneading the resin with the rubber may be either an unvulcanized rubber or a vulcanized rubber. In the case of using the unvulcanized rubber, vulcanization usually proceeds during the kneading. In the kneading, the vulcanizing agent may be contained in at least the unvulcanized rubber, and at least one of the resin and the vulcanized rubber may be formed from a composition containing a vulcanization-activating agent or a polyalkenylene. The vulcanizing agent and/or the vulcanization-activating agent is preferably added to the, resin and/or the rubber beforehand, and, if necessary, may be newly added in the kneading process.

More specifically, the composite dispersion of the present invention can for example be produced by melt-kneading a resin (thermoplastic resin) containing a vulcanization-activating agent or a polyalkenylene with an unvulcanized rubber (unvulcanized rubber composition) containing at least a vulcanizing agent under heating, and cooling the resulting product for solidification. Both of the unvulcanized rubber and the resin show plastic property in the early state of kneading, and as vulcanization proceeds, the unvulcanized rubber becomes less plastic, the unvulcanized rubber finally turns into a vulcanized rubber, and the vulcanized rubber is dispersed in the resin phase to form a dispersed phase.

Moreover, the composite dispersion of the present invention may be obtained by kneading a resin with a vulcanized rubber. In this method, the vulcanized rubber is usually employed in the form of a vulcanized particulate previously produced by freeze-pulverizing or by polymerization with a vulcanizing agent. The shape or form of the particulate is not particularly limited as far as the shape is suitable for the dispersed phase, and may for example be a spherical, an elliptical, or a rod-like type. Moreover, in this method, the resin (and if necessary the vulcanized rubber) may be formed from a composition containing the vulcanizing agent, the vulcanization-activating agent, the polyalkenylene, and others.

The kneading may be carried out with a conventional kneading machine (e.g., an extruder, a kneader). The kneading temperature may be suitably established depending on the species of the resin to be used, and for example, the kneading temperature is about 50 to 350° C., preferably about 100 to 300° C., and more preferably about 150 to 250° C. (e.g., about 170 to 230° C.).

The cooling for solidification of the melt-kneaded product may be carried out by a suitable method, for example, by water-cooling the melt-kneaded product extruded as a strand from an extruder, or others. The above-mentioned kneaded product obtained by cooling for solidification may be processed into a pellet (and cut) by a pelletizing machine.

The composite dispersion of the present invention may form various shaped (or molded) articles. The composite dispersion obtained by the above method is usually stored as a worked material (e.g., a pellet), and then is heat-melted again by a suitable processing method (e.g., a injection molding, compression molding) to be shaped (or molded) in response to the purpose. The re-melting temperature of the composite dispersion depends on the species of the resin constituting the composite, and is, for example, about 50 to 350° C., preferably about 100 to 300° C., and more preferably about 150 to 250° C. (e.g., about 170 to 230° C.).

Incidentally, in the case where all the processing temperatures in the kneading process and molding process are low temperatures (e.g., below 150° C.), the bonding of the resin phase with the rubber phase is sometimes not enough, depending on the species of the vulcanizing agent or vulcanization-activating agent to be used, for the reason why vulcanization of the rubber dispersed in the resin is not adequately proceeded, or for other reasons. Therefore, vulcanization of the rubber or crosslinking between the resin phase and the rubber phase may culminate by setting a mold temperature in the molding process up as not less than 150° C. (e.g., 150 to 300° C.) or by heating the shaped article at not less than 150° C. for an adequate time with the use of a heating furnace or others.

Moreover, the shaped article formed from the composite dispersion of the present invention may be produced by carrying out the kneading step of the rubber and the resin and the molding step of the composite dispersion individually as described above, or may be produced by combining the both steps. That is, the rubber and the resin are kneaded together, and then the resultant melt mixture may be directly shaped or molded. As the shaped article obtained by such a method, there may be mentioned an odd-shaped article which can be directly formed by an extruder for kneading the resin and the rubber, e.g., a film, a sheet, a tube, a rod, a rail, and others.

According to the present invention, by combining a specific resin and rubber even in a wide range can be obtained a composite dispersion in which a continuous phase comprising a resin and a dispersed phase comprising a vulcanized rubber are firmly bonded to each other. Moreover, the present invention ensures bonding of a resin phase to a vulcanized rubber phase by a convenient process. Further, according to the present invention, since the vulcanized rubber phase can be dispersed in the resin phase and the both phase are firmly bonded to each other, rubber properties can be effectively imparted to the resin.

INDUSTRIAL APPLICABILITY

In thus obtained composite dispersion, the resin phase is firmly bonded to the vulcanized rubber obtained by vulcanization of the unvulcanized rubber in the condition that the resin phase and the vulcanized rubber constitute the continuous phase and the dispersed phase, respectively. Moreover, since the dispersed phase particle (vulcanized rubber phase) can be partially exposed to the surface of the composite dispersion, both resin and rubber properties can be expressed effectively. Therefore, the composite dispersion of the present invention can be advantageously utilized for a variety of purposes, for example, as various members such as automotive parts (e.g., a vibrational absorption bush, a spring plate, and a radiator mount), rubber cushions, valves, and electric plugs.

EXAMPLES

The following examples are intended to describe this invention in further detail and should by no means be interpreted as defining the scope of the invention. Incidentally, in the Examples and Comparative Examples, the following resins (or resin compositions) and rubber compositions were used.

[Resins (A) to (F)]

Resin A1 to A6

As a thermoplastic resin, a polyamide 612 (a polycondensation product of hexamethylenediamine and dodecanedicarboxylic acid) was produced, and the following resins or resin compositions (A1 to A6) were prepared. Incidentally, an MOPACPM3 calculation was carried out according to the following basic unit:

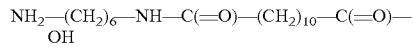

Resin (A1):
Preparation of Resin A1: An aqueous solution containing a salt of hexamethylenediamine with dodecanedicarboxylic acid in an amount of 80% by weight was heated at 220° C. under an applied pressure (inner pressure) (17.5 kg/cm$^2$ (about 1715 kPa)) in an autoclave substituted with nitrogen gas, and removed water with the nitrogen gas from the reaction system over 4 hours. Subsequently, the temperature of the system was gradually increased up to 275° C. over 1 hour to remove water remaining in the system, the applied pressure (inner pressure) of the autoclave was reduced to be an atmospheric pressure. After cooling, a polyamide 612 was obtained. The resultant polymer had a number average molecular weight (Mn) of about 20000 to 25000, and a molar ratio of terminal amino group/terminal carboxyl group=about 1/1, and in the case where a vulcanizing agent was a radical-generating agent, the number of the active hydrogen atom having the orbital interaction energy coefficient S of not less than 0.006 was calculated as 4 per molecule. The polymer was used alone as Resin (A1).

Resin (A2):
Preparation of Resin A2: A vulcanization-activating agent (TRIM: trimethylolpropane trimethacrylate) (3 parts by weight) was blended to 100 parts by weight of the resin (A1), and the resulting product was used as Resin (A2).

Resin (A3):
Preparation of Resin A3: Relative to 100 parts by weight of the resin (A1), 3 parts by weight of a vulcanization-activating agent (TRIM: trimethylolpropane trimethacrylate) and 10 parts by weight of a polyoctenylene ("Vestenamer 8012" manufactured by Degussa AG) were blended, and the resulting product was used as Resin (A3).

Resin (A4):
Preparation of Resin A4: The resin (A1) and the following resin (A6) were kneaded in a weight ratio of 1/1 [the former/the latter] by a biaxial extruder to give a polyamide 612 having a molecular weight of 22000 and a molar ratio of terminal amino group/terminal carboxyl group =about 3/7. Regarding the resultant polymer, in the case where a vulcanizing agent was a radical-generating agent, the number of the active hydrogen atom having the orbital interaction energy coefficient S of not less than 0.006 was calculated as 2.4 per molecule. The polymer was used alone as Resin (A4).

Resin (A5):
Preparation of Resin A5: Relative to 100 parts by weight of the resin (A4), 3 parts by weight of a vulcanization-activating agent (TRIM: trimethylolpropane trimethacrylate) was blended, and the resulting product was used as Resin (A5).

Resin (A6):
Preparation of Resin A6: To an aqueous solution containing a salt of hexamethylenediamine with dodecanedicarboxylic acid in an amount of 80% by weight was added a predetermined amount of dodecanedicarboxylic acid, and the mixture was heated at 220° C. under an applied pressure (inner pressure) (17.5 kg/cm$^2$ (about 1715 kPa)) in an autoclave substituted with nitrogen gas, and removed water with the nitrogen gas from the reaction system over 4 hours. Subsequently, the temperature of the system was gradually elevated up to 275° C. over 1 hour to discharge residual water in the system, and the applied pressure (inner pressure) of the autoclave was reduced to be an atmospheric pressure. After cooling, a polyamide 612 was obtained. The obtained polymer had a number average molecular weight (Mn) of about 20000 and a ratio of terminal amino group/terminal carboxyl group was about 1/9, and in the case where a vulcanizing agent was a radical-generating agent, the number of the active hydrogen atom having the orbital interaction energy coefficient S of not less than 0.006 was calculated as 0.8 per molecule. The polymer was used alone as Resin (A6).

Resin (B)

A polyamide 6 was prepared as a thermoplastic resin. A vulcanization-activating agent (TRIM: trimethylolpropane trimethacrylate) (3 parts by weight) was blended to the polyamide 6, and the resultant product was used as Resin (B). Incidentally, an MOPACPM3 calculation was carried out according to the following formula:

$NH_2$—$(CH_2)_5$—$C(=O)$—$NH$—$(CH_2)_5$—$C(=O)$—OH

Preparation of polyamide 6: An aqueous solution containing E-caprolactam in an amount of 80% by weight was heated at 250 to 260° C. in the presence of a small amount of phosphoric acid in an autoclave substituted with nitrogen gas to remove water with nitrogen gas from the reaction system over 4 hours. Subsequently, the temperature of the inside system was gradually elevated to 275° C. for taking 1 hour to remove a residual water to outside system. After cooling, a polyamide 6 was obtained. The obtained polymer had a number average molecular weight (Mn) of about 20000 to 25000 and a ratio of terminal amino group/terminal carboxyl group being about 1/1, and in the case where a vulcanizing agent was a radical-generating agent, the number of the active hydrogen atom having the orbital interaction energy coefficient S of not less than 0.006 was calculated as 4 per molecule.

Resin (C)

As a thermoplastic resin, an alicyclic polyamide [a polycondensation product of bis(4-aminocyclohexyl)methane and dodecanedicarboxylic acid] was prepared, and 3 parts by weight of a vulcanization-activating agent (TRIM: trimethylolpropane trimethacrylate) was mixed with the alicyclic polyamide, and the resulting product was used as Resin (C). Incidentally, an MOPACPM3 calculation was carried out according to the following basic unit:

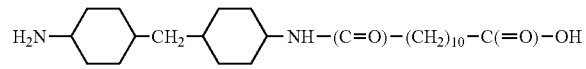

Preparation of alicyclic polyamide: A preparation procedure was conducted in the same manner as in the resin (A1) except that the combination of monomers was bis(4-aminocyclohexyl)methane and dodecanedicarboxylic acid, and a polymer having a number average molecular weight (Mn) of 20000 to 25000 and a ratio of terminal amino group/terminal carboxyl group being about 1/1 was obtained. In the case where a vulcanizing agent was a radical-generating agent, the number of the active hydrogen atom having the orbital interaction energy coefficient S of the polymer of not less than 0.006 was calculated as 3 per molecule.

Resins (D1 to D4)

A polybutylene terephthalate was produced as a thermoplastic resin, and a resin or resin composition was prepared. Incidentally, an MOPACPM3 calculation was carried out according to the following basic unit:

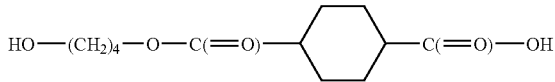

Resin (D1):

Preparation of Resin D1: To a polymerization reactor (tube) which was equipped with a stirrer, a nitrogen-introducing unit and a distilling unit and connected to a vacuum system, 1.82 g of calcium acetate and 3.64 g of antimony oxide were added into the mixture of 883 g of distilled and purified dimethyl terephthalate and 819 g of butanediol. The tube was heated at 180° C. in an oil bath with supplying nitrogen gas at a sluggish pace. At the point when a distillation amount of methanol was reached to a level of theory value, the mixture was stirred with increasing the temperature of the system gradually from 250 to 260° C. and with gently enhancing a degree of vacuum to reach not higher than 100 Pa. With distilling produced butanediol in small portions, the condensation reaction was progressed for 2 to 3 hours. The relative viscosity of the reaction product was measured ad libtum in a mixed solvent comprising tetrachloroethane and phenol in a volume ratio (the former/the latter) of 40/60, and the reaction was completed after the number average molecular weight of the product reached about 10000. Regarding the obtained polymer, in the case where a vulcanizing agent was a radical-generating agent, the number of the active hydrogen atom having the orbital interaction energy coefficient S of not less than 0.006 was calculated as 0 per molecule. The resultant resin was used alone as Resin (D1).

Resin (D2):

Preparation of Resin D2: Relative to 100 parts by weight of the resin (D1), 1 part by weight of a vulcanization-activating agent (HVA2: m-phenylenebismaleimide) was blended, and the resulting product was used as Resin (D2).

Resin (D3):

Preparation of Resin D3: Relative to 100 parts by weight of the resin (D1), 3 parts by weight of a vulcanization-activating agent (TRIM: trimethylolpropane trimethacrylate) was blended, and the obtained product was used as Resin (D3).

Resin (D4):

Preparation of Resin D4: Ten (10) parts by weight of a polyoctenylene ("Vestenamer 8012" manufactured by Degussa AG) was blended relative to 100 parts by weight of the resin (D1), and the obtained product was used as Resin (D4).

Resins (E1 and E2)

As a crosslinkable resin, a polybutylene terephthalate containing an unsaturated bond was produced to prepare a resin or resin composition.

Resin (E1):

Preparation of Resin E1: A preparation procedure was conducted in the same manner as in the resin (D) except for using 747 g of butanediol and 70.4 g of butenediol in lieu of 819 g of butanediol, and a polymer having a number average molecular weight of about 10000 was obtained. Regarding the resultant polymer, in the case where a vulcanizing agent was a radical-generating agent, the number of the active hydrogen atom having the orbital interaction energy coefficient S of not less than 0.006 was calculated as 0 per molecule, and the concentration of the unsaturated bond was 4 on the average per molecule and 0.4 mol/kg. The polymer was used alone as Resin (El).

Resin (E2):

Preparation of Resin E2: Relative to 100 parts by weight of the resin (E1), 3 parts by weight of a vulcanization-activating agent (TRIM: trimethylolpropane trimethacrylate) was blended, and the obtained product was used as Resin (E2).

Resin (F)

Preparation of Resin F: Ten (10) parts by weight of a polyoctenylene ("Vestenamer 8012" manufactured by Degussa AG) was blended relative to 100 parts by weight of a modified polyphenylene ether resin ("NORYL 731" manufactured by General Electric Japan), and the obtained product was used as Resin (F). Regarding the resultant polymer, in the case where a vulcanizing agent was a radical-generating agent, the number of the active hydrogen atom was calculated as not less than 4 per molecule. Incidentally, an MOPACPM3 calculation was carried out according to the following basic unit:

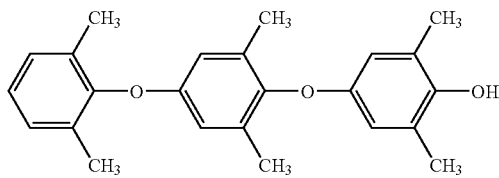

[Unvulcanized Rubber Composition (R)]

The following components were blended at predetermined proportions to prepare unvulcanized rubber compositions (R1 to R10).

Rubber Composition (R1)
(i) 100 parts by weight of an ethylene-propylene-diene rubber ("Keltan 509×100" manufactured by DSM),
(ii) 2.5 parts by weight of a radical-generating agent [an organic peroxide (dicumyl peroxide)],
(iii) 1 part by weight of a filler ("N582" manufactured by Asahi Carbon Co., Ltd.),
(iv) 5 parts by weight of a plasticizer ("Diana Process Oil NS100" manufactured by Idemitsu Kosan Co., Ltd.),
(v) 3 parts by weight of zinc oxide, and
(vi) 1 part by weight of stearic acid Rubber Composition (R2)
(i) 100 parts by weight of an ethylene-propylene-diene rubber ("Keltan 509×100" manufactured by DSM),
(ii) 2.5 parts by weight of a radical-generating agent [an organic peroxide (dicumyl peroxide)],
(iii) 3 parts by weight of a vulcanization-activating agent (TRIM: trimethylolpropane trimethacrylate),
(iv) 1 part by weight of a filler ("N582" manufactured by Asahi Carbon Co., Ltd.),
(v) 5 parts by weight of a plasticizer ("Diana Process Oil NS100" manufactured by Idemitsu Kosan Co., Ltd.),
(vi) 3 parts by weight of zinc oxide, and
(vii) 1 part by weight of stearic acid Rubber Composition (R3)
(i) 100 parts by weight of an ethylene-propylene-diene rubber ("Keltan 509×100" manufactured by DSM),
(ii)-2.5 parts by weight of a radical-generating agent [an organic peroxide (dicumyl peroxide)],
(iii) 5 parts by weight of a polyoctenylene ("Vestenamer 8012" manufactured by Degussa AG),
(iv) 1 part by weight of a filler ("N582" manufactured by Asahi Carbon Co., Ltd.),
(v) 5 parts by weight of a plasticizer ("Diana Process Oil NS100" manufactured by Idemitsu Kosan Co., Ltd.),
(vi) 3 parts by weight of zinc oxide, and
(vii) 1 part by weight of stearic acid Rubber composition (R4)
(i) 100 parts by weight of an ethylene-propylene-diene rubber ("Keltan 509×100" manufactured by DSM),
(ii) 2.5 parts by weight of a radical-generating agent [an organic peroxide (dicumyl peroxide)],
(iii) 3 parts by weight of a vulcanization-activating agent (TRIM: trimethylolpropane trimethacrylate),
(iv) 5 parts by weight of a polyoctenylene ("Vestenamer 8012" manufactured by Degussa AG),
(v) 1 part by weight of a filler ("N582" manufactured by Asahi Carbon Co., Ltd.),
(vi) 5 parts by weight of a plasticizer ("Diana Process Oil NS100" manufactured by Idemitsu Kosan Co., Ltd.),
(vii) 3 parts by weight of zinc oxide, and
(viii) 1 part by weight of stearic acid Rubber Composition (R5)
(i) 100 parts by weight of a vinyl silicone rubber ("Silicone rubber SH851" manufactured by Toray Dow Corning Co., Ltd.), and
(ii) 2.5 parts by weight of a radical-generating agent [an organic peroxide (dicumyl peroxide)]

Rubber Composition (R6)
(i) 100 parts by weight of a vinyl silicone rubber ("Silicone rubber SH851" manufactured by Toray Dow Corning Co., Ltd.),
(ii) 2.5 parts by weight of a radical-generating agent [an organic peroxide (dicumyl peroxide)], and
(iii) 0.5 part by weight of a vulcanization-activating agent (TRIM: trimethylolpropane trimethacrylate)

Rubber Composition (R7)
(i) 100 parts by weight of a fluorine-containing rubber (FKM, "Dai EL G902" manufactured by Daikin Industries Ltd.),
(ii) 2.5 parts by weight of a radical-generating agent [an organic peroxide (dicumyl peroxide)], and
(iii) 3 parts by weight of a vulcanization-activating agent (TAIC: triallylisocyanurate)

Rubber Composition (R8)
(i) 100 parts by weight of a carboxylic nitrile rubber (X-NBR) ("Nipol 1072J" manufactured by Zeon Corporation),
(ii) 0.2 part by weight of a radical-generating agent [an organic peroxide (dicumyl peroxide)], and
(iii) 5 parts by weight of a polyoctenylene ("Vestenamer 8012" manufactured by Degussa AG)

Rubber Composition (R9)
(i) 100 parts by weight of a styrene-butadiene rubber ["JSR 0202" manufactured by JSR Corporation (styrene content: 46%)],
(ii) 50 parts by weight of a filler ("N582" manufactured by Asahi Carbon Co., Ltd.),
(iii) 2 parts by weight of a sulfur [powdered sulfur (Kinkajirushi fine powdered sulfur) manufactured by Tsurumi Kagaku Kogyo K.K.],
(iv) 10 parts by weight of a plasticizer ("Diana Process Oil NS100" manufactured by Idemitsu Kosan Co., Ltd.),
(v) 5 parts by weight of zinc oxide, and
(vi) 1 part by weight of stearic acid Rubber Composition (R10)
 (i) 60 parts by weight of a styrene-butadiene rubber ["JSR 0202" manufactured by JSR Corporation (styrene content: 46%)],
 (ii) 40 parts by weight of a natural rubber (made in Thailand, #3),
 50 parts by weight of a filler ("N582" manufactured by Asahi Carbon Co., Ltd.),
 (iii) 2 parts by weight of a sulfur [powdered sulfur (Kinkajirushi fine powdered sulfur) manufactured by Tsurumi Kagaku Kogyo K.K.],
 (iv) 10 parts by weight of a plasticizer ("Diana Process Oil NS100" manufactured by Idemitsu Kosan Co., Ltd.),
 (v) 5 parts by weight of zinc oxide, and
 (vi) 1 part by weight of stearic acid Examples 1 to 19 and Comparative Examples 1 to 5

(Preparation of Composite Dispersion)

The resin or resin composition was mixed and kneaded with a kneader whose temperature was regulated depending on the species of the resin. To the kneaded product was further added the above unvulcanized rubber composition prepared by a separate roll in the combination as shown in Table 1. Mixed and kneaded a rubber component of thereof was allowed to proceed in vulcanization to obtain a composite dispersion. The amount to be added of the unvulcanized rubber composition was defined as 40 parts by weight relative to 60 parts by weight of the resin composition in the kneader, and the unvulcanized rubber composition was added to the resin composition four times by 10 parts by weight over a period of 10 minutes in total. The preset temperatures of the kneader were 240° C. when the resins or resin compositions were the resins A1 to A6, B, D1 to D4, E1 to E2 and F, and 270° C. when the resin or resin composition was the resin C, respectively.

(Impact Test)

The composite dispersion mentioned above was molded into a flat plate 6 mm thick by compression molding, and then the plate was cut to give a test piece having a predetermined shape. The test piece was subjected to Izod impact test. For comparison, a test piece made of a polyamide 612 alone, and that of a polybutylene terephthalate alone were produced to subject to Izod impact test, respectively (Comparative Examples 1 and 4).

(Drawing Test)

The composite dispersion mentioned above was molded into a flat plate 3 mm thick by compression molding. Then, the flat plate was cut to a width of 15 mm to make a test piece for a tensile test, and the test piece was subjected to a tensile test at 50 mm/minute. The evaluation in the drawing test was determined based on the following criteria.

"A": The breaking elongation was not less than 200%, the disorder or delamination phenomenon in the test piece surface was not found until the test piece was broken, and the whitening or fibrillation was not recognized on the broken surface.

"B": The breaking elongation was not less than 200%, but the whitening or fibrillation was recognized around the broken surface.

"C": The breaking elongation came short of 200%, and the delamination phenomenon appeared as the test piece was drawn.

(Peel Test (or Friction Test))

The bonding strength between the rubber and the resin was measured as the following manner.

The resin or resin composition was mixed and kneaded by a biaxial extruder to give a kneaded product, and the product was molded into a flat plate 3 mm thick by an injection molding machine. On the other hand, the unvulcanized rubber composition was obtained by mixing each component with the use of an open roll. Then, the unvulcanized rubber composition was put on the upper side of the resin plate in combination as shown in Table 1 to form a rubber layer, and the rubber layer was vulcanized over 10 minutes by a compression molding machine regulated at 170° C. with adjusting the thickness of the rubber layer to 3 mm so that the rubber layer was bonded to the resin plate. On this occasion, one-third of the resin plate was covered with aluminum foil to avoid direct contact between the resin and the rubber, and the covered part was used as a tong hold in the peel test between the rubber and the resin. Such obtained flat plate comprised of the resin-rubber composite was cut to a vertical width of 30 mm, and the tong hold of the resin part and that of the rubber part were fixed on a chuck of a tensile tester, respectively, to subject the flat plate to 180° peel test at a tensile rate of 50 mm/minute. The evaluation of the peel test was determined based on the following criteria.

"A": Abruption proceeds by cohesive failure of the rubber layer.

"B": Abruption proceeds by cohesive failure of the rubber layer in combination with interfacial abruption between the resin layer and the rubber layer, but enough adhesion strength is recognized.

"C": Abruption only proceeds by interfacial abruption between the resin layer and the rubber layer, and enough adhesion strength is not found.

The results are shown in Table 1. Incidentally, in Table 1, the abbreviated expressions "VA" and "VM" mean a vulcanization-activating agent and a polyoctenylene, respectively.

As apparent from Table 1, in each composite dispersion of Examples, the continuous phase and the dispersed phase were directly bonded firmly to each other, and such a composite showed high impact strength and high tensile strength.

TABLE 1

|  | Com Ex 1 | Com Ex 2 | Ex 1 | Ex 2 | Ex 3 | Ex 4 | Ex 5 | Ex 6 | Ex 7 | Ex 8 | Ex 9 | Com Ex 3 |
|---|---|---|---|---|---|---|---|---|---|---|---|---|
| Resin material |
| Resin | A1 | A1 | A2 | A1 | A1 | A2 | A3 | A2 | A1 | A5 | A4 | A6 |
| Active atom (pcs) | 4 | 4 | 4 | 4 | 4 | 4 | 4 | 4 | 4 | 2.4 | 2.4 | 0.8 |
| Concentration of unsaturated bond (mol/kg) | 0 | 0 | 0 | 0 | 0 | 0 | 0 | 0 | 0 | 0 | 0 | 0 |

TABLE 1-continued

|  |  |  |  |  |  |  |  |  |  |  |  |  |
|---|---|---|---|---|---|---|---|---|---|---|---|---|
| VA (parts by weight) | — | — | 3 | — | — | 3 | 3 | 3 | — | 3 | — | — |
| VM (parts by weight) | — | — | — | — | — | — | 10 | — | — | — | — | — |
| Vulcanizing agent/VM (weight ratio) | — | — | — | — | — | — | 14/86 | — | — | — | — | — |
| Rubber material |  |  |  |  |  |  |  |  |  |  |  |  |
| Rubber | — | R1 | R1 | R2 | R3 | R3 | R1 | R5 | R7 | R3 | R4 | R1 |
| Vulcanizing agent (parts by weight) | — | 2.5 | 2.5 | 2.5 | 2.5 | 2.5 | 2.5 | 2.5 | 2.5 | 2.5 | 2.5 | 2.5 |
| VA (parts by weight) | — | — | — | 3 | — | — | — | — | 3 | — | 3 | — |
| Vulcanizing agent/VA (weight ratio) | — | — | — | 45/55 | — | — | — | — | 45/55 | — | 45/55 | — |
| VM (parts by weight) | — | — | — | — | 5 | 5 | — | — | — | 5 | 5 | — |
| Vulcanizing agent/VM (weight ratio) | — | — | — | — | 33/67 | 33/67 | — | — | — | 33/67 | 33/67 | — |
| Evaluation |  |  |  |  |  |  |  |  |  |  |  |  |
| Peel test | — | B | A | A | B | A | A | A | A | A | A | C |
| Impact strength (J/m) | 70 | 250 | no break | no break | no break | no break | no break | no break | no break | no break | no break | 180 |
| Drawing test | — | C | B | B | B | A | A | A | A | A | A | C |
| comprehensive evaluation | — | C | B | B | B | A | A | A | A | A | A | C |

|  | Ex 10 | Ex 11 | Com Ex 4 | Com Ex 5 | Ex 12 | Ex 13 | Ex 14 | Ex 15 | Ex 16 | Ex 17 | Ex 18 | Ex 19 |
|---|---|---|---|---|---|---|---|---|---|---|---|---|
| Resin material |  |  |  |  |  |  |  |  |  |  |  |  |
| Resin | B | C | D1 | D1 | D2 | D3 | D4 | E1 | E2 | F | F | F |
| Active atom (pcs) | 4 | 3 | 0 | 0 | 0 | 0 | 0 | 0 | 0 | 4 or more | 0 | 0 |
| Concentration of unsaturated bond (mol/kg) | 0 | 0 | 0 | 0 | 0 | 0 | 0 | 0.4 | 0.4 | 0 | 0 | 0 |
| VA (parts by weight) | 3 | 3 | — | — | 1 | 3 | — | — | 3 | — | — | — |
| VM (parts by weight) | — | — | — | — | — | — | 10 | — | — | 10 | 10 | 10 |
| Vulcanizing agent/VM (weight ratio) | — | — | — | — | — | — | 15/85 | — | — | 14/86 | 8/92 | 8/92 |
| Rubber material |  |  |  |  |  |  |  |  |  |  |  |  |
| Rubber | R8 | R8 | — | R5 | R5 | R6 | R5 | R5 | R5 | R2 | R9 | R10 |
| Vulcanizing agent (parts by weight) | 0.2 | 0.2 | — | 2.5 | 2.5 | 2.5 | 2.5 | 2.5 | 2.5 | 2.5 | 2 | 2 |
| VA (parts by weight) | — | — | — | — | 0.5 | — | — | — | — | 3 | — | — |
| Vulcanizing agent/VA (weight ratio) | — | — | — | — | 83/17 | — | — | — | — | 45/55 | — | — |
| VM (parts by weight) | 5 | 5 | — | — | — | — | — | — | — | — | — | — |
| Vulcanizing agent/VM (weight ratio) | 4/96 | 4/96 | — | — | — | — | — | — | — | — | — | — |
| Evaluation |  |  |  |  |  |  |  |  |  |  |  |  |
| Peel test | A | A | — | C | A | A | B | B | A | A | A | A |
| Impact strength (J/m) | no break | no break | 60 | 220 | no break | no break | no break | no break | no break | no break | no break | no break |
| Drawing test | A | A | — | C | A | A | B | A | A | A | A | A |
| comprehensive evaluation | A | A | — | C | A | A | B | B | A | A | A | A |

The invention claimed is:

1. A composite dispersion which comprises:

a continuous phase comprising a resin; and a dispersed phase being directly bonded to the continuous phase and comprising a vulcanized rubber formed by vulcanizing an unvulcanized rubber, wherein the continuous phase and the dispersed phase form an islands-in-an ocean structure, the resin is a resin containing a vulcanization-activating agent, or a crosslinkable group-containing resin, the vulcanization-activating agent comprises at least one member selected from the group consisting of an organic compound having at least two polymerizable unsaturated bonds per molecule, and a maleimide-series compound, and the crosslinkable group-containing resin is a thermoplastic resin having an unsaturated bond and comprising at least one member selected from the group consisting of a polyamide-series resin, a polyester-series resin, a polyoxyalkylene-series resin, a polythioether-series resin, a polycarbonate-series resin, a polyimide-series resin, a polysulfone-series resin, a polyurethane-series resin, a polyolefin-series resin, a halogen-containing resin, a styrenic resin, a (meth)acrylic resin, and a thermoplastic elastomer.

2. A composite dispersion according to claim 1, wherein said composite dispersion comprises the thermoplastic resin having an unsaturated bond which is at least one of the following resin (i) or (ii):

(i) a resin produced by a reaction of a polymerizable compound having a reactive group (A) and an unsaturated bond with a thermoplastic resin having a reactive group (B) which is reactive to the reactive group (A), or (ii) a thermoplastic resin into which an unsaturated bond is introduced by copolymerization or copolycondensation.

3. A composite dispersion according to claim 1, wherein the thermoplastic resin having an unsaturated bond has an unsaturated bond in a proportion of 0.01 to 6.6 mol relative to 1 kg of the thermoplastic resin.

4. A composite dispersion according to claim 1, wherein the resin comprises at least one member selected from the group consisting of a polyamide-series resin, a polyester-series resin, a poly(thio)ether-series resin, a polycarbonate-series resin, a polyimide-series resin, a polysulfone-series resin, a polyurethane-series resin, a polyolefin-series resin, a halogen-containing resin, a styrenic resin, a (meth)acrylic resin, and a thermoplastic elastomer.

5. A composite dispersion according to claim 1, wherein the resin comprises at least one member selected from the group consisting of an aliphatic polyamide-series resin, an aromatic polyester-series resin, a polyphenylene ether-series resin, and a polysulfide-series resin.

6. A composite dispersion according to claim 1, wherein the resin has at least two atoms on the average per molecule, and each of atoms is selected from a hydrogen atom and/or a sulfur atom and has an orbital interaction energy coefficient S of not less than 0.006, wherein the orbital interaction energy coefficient S is represented by the following formula (1):

$$S=(C_{HOMO,n})^2/|E_c-E_{HOMO,n}|+(C_{LUMO,n})^2/|E_c-E_{LUMO,n}| \quad (1)$$

in the formula, each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of a radical-generating agent, $C_{HOMO,n}$ representing a molecular-orbital coefficient of the highest occupied molecular orbital (HOMO) of an n-th hydrogen atom and/or sulfur atom constituting a basic unit of the resin, $E_{HOMO,n}$ representing an orbital energy (eV) of the HOMO, $C_{LUMO,n}$ representing a molecular-orbital coefficient of the lowest unoccupied molecular orbital (LUMO) of the n-th hydrogen atom and/or sulfur atom constituting the basic unit of the resin, and $E_{LUMO,n}$ representing an orbital energy (eV) of the LUMO.

7. A composite dispersion according to claim 1, wherein the vulcanized rubber comprises at least one member selected from the group consisting of a diene-series rubber, an olefinic rubber, an acrylic rubber, a fluorine-containing rubber, a silicone-series rubber, and a urethane-series rubber.

8. A composite dispersion according to claim 1, wherein at least the unvulcanized rubber of the resin and the unvulcanized rubber comprises at least one vulcanizing agent selected from the group consisting of a radical-generating agent and a sulfur.

9. A composite dispersion according to claim 8, wherein the radical-generating agent comprises at least one member selected from the group consisting of an organic peroxide, an azo compound, and a sulfur-containing organic compound.

10. A composite dispersion according to claim 8, wherein the proportion of the vulcanizing agent is 0.1 to 10 parts by weight relative to 100 parts by weight of the unvulcanized rubber.

11. A composite dispersion according to claim 1, wherein the proportion of the vulcanization-activating agent is 0.1 to 10 parts by weight relative to 100 parts by weight of the resin.

12. A composite dispersion according to claim 1, wherein at least one component selected from the group consisting of the resin and the unvulcanized rubber contains a polyalkenylene.

13. A composite dispersion according to claim 12, wherein the proportion of the polyalkenylene is 1 to 30 parts by weight relative to 100 parts by weight of the resin or the unvulcanized rubber.

14. A composite dispersion which comprises:

a continuous phase comprising a resin; and a dispersed phase being directly bonded to the continuous phase and comprising a vulcanized rubber formed by vulcanizing an unvulcanized rubber, wherein the continuous phase and the dispersed phase form an islands-in-an ocean structure, and a combination of the resin and/or the unvulcanized rubber is any one of the following combinations (a) to (d):

(a) a combination of a resin, and an unvulcanized rubber containing a vulcanizing agent and a vulcanization-activating agent, wherein the weight ratio of the vulcanizing agent relative to the vulcanization-activating agent [the former/the latter] is 2/98 to 70/30, and the vulcanization-activating agent comprises at least one member selected from the group consisting of an organic compound having at least two polymerizable unsaturated bonds per molecule, and a maleimide-series compound;

(b) a combination of a polyamide-series resin, and an unvulcanized rubber containing a vulcanizing agent and a polyalkenylene, wherein the weight ratio of the vulcanizing agent relative to the polyalkenylene [the former/the latter] is 2/98 to 45/55;

(c) a combination of a resin and a silicone-series unvulcanized rubber; and (d) a combination of a polyphenylene ether-series resin containing a polyalkenylene, and an unvulcanized rubber containing a sulfur or a sulfur-containing organic compound as a vulcanizing agent.

15. A composite dispersion according to claim 14, wherein the resin has at least two atoms on the average per molecule, and each of the atoms is selected from a hydrogen atom and/or a sulfur atom and has the orbital interaction energy coefficient S of not less than 0.006, wherein the orbital interaction energy coefficient S is represented by the following formula (1):

$$S=(C_{HOMO,n})^2/|E_c-E_{HOMO,n}|+(C_{LUMO,n})^2/|E_c-E_{LUMO,n}| \quad (1)$$

in the formula, each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of a radical-generating agent, $C_{HOMO,n}$ representing a molecular-orbital coefficient of the highest occupied molecular orbital (HOMO) of an n-th hydrogen atom and/or sulfur atom constituting a basic unit of the resin, $E_{HOMO,n}$ representing an orbital energy (eV) of the HOMO, $C_{LUMO,n}$ representing a molecular-orbital coefficient of the lowest unoccupied molecular orbital (LUMO) of the n-th hydrogen atom and/or sulfur atom constituting the basic unit of the resin, and $E_{LUMO,n}$ representing an orbital energy (eV) of the LUMO.

16. A composite dispersion according to claim 14, wherein the unvulcanized rubber contains a vulcanization-activating agent.

17. A composite dispersion according to claim 14, wherein the unvulcanized rubber contains a polyalkenylene.

18. A composite dispersion according to claim 1 or 14, wherein the resin and/or the unvulcanized rubber has a molecular weight of not more than 1000, and comprises at least one member selected from the group consisting of the following compounds: (I) a compound having two hydrogen atoms on the average per molecule, each atom having the orbital interaction energy coefficient S of not less than 0.006,
wherein the orbital interaction energy coefficient S is represented by the following formula (1):

$$S = (C_{HOMO,n})^2 / |E_c - E_{HOMO,n}| + (C_{LUMO,n})^2 / |E_c - E_{LUMO,n}| \quad (1)$$

in the formula, each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of a radical-generating agent, $C_{HOMO,n}$ representing a molecular-orbital coefficient of the highest occupied molecular orbital (HOMO) of an n-th hydrogen atom and/or sulfur atom constituting a basic unit of the resin, $E_{HOMO,n}$ representing an orbital energy (eV) of the HOMO, $C_{LUMO,n}$ representing a molecular-orbital coefficient of the lowest unoccupied molecular orbital (LUMO) of the n-th hydrogen atom and/or sulfur atom constituting the basic unit of the resin, and $E_{LUMO,n}$ representing an orbital energy (eV) of the LUMO;

(II) a compound having not less than one group selected from the group consisting of a carboxyl group, an acid anhydride group and an isocyanate group per molecule; and (III) a silane coupling agent.

19. A composite dispersion according to claim 1 or 14, wherein the weight ratio of the continuous phase relative to the dispersed phase [the continuous phase/the dispersed phase] is 25/75 to 98/2.

20. A process for producing a composite dispersion recited in claim 1 or 14, which comprises kneading a resin and an unvulcanized rubber to give the composite dispersion.

21. A shaped article which is formed from a composite dispersion recited in claim 1 or 14.

* * * * *